(12) United States Patent  (10) Patent No.: US 8,517,840 B2
Newman et al.  (45) Date of Patent: Aug. 27, 2013

(54) METHODS AND SYSTEMS FOR PROVIDING A CHALLENGE USER INTERFACE FOR AN ENTERPRISE SOCIAL NETWORK

(75) Inventors: Joshua Newman, San Francisco, CA (US); Jonathan Hersh, San Francisco, CA (US); Lahini Arunachalam, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 70 days.

(21) Appl. No.: 13/249,923

(22) Filed: Sep. 30, 2011

(65) Prior Publication Data

US 2012/0214597 A1 Aug. 23, 2012

Related U.S. Application Data

(60) Provisional application No. 61/444,544, filed on Feb. 18, 2011.

(51) Int. Cl.
*G06F 17/00* (2006.01)

(52) U.S. Cl.
USPC .......................................................... 463/42

(58) Field of Classification Search
USPC ................ 700/92; 709/204, 205; 463/40–43
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |

(Continued)

*Primary Examiner* — Ronald Laneau

(74) *Attorney, Agent, or Firm* — Ingrassia Fisher & Lorenz, P.C.

(57) ABSTRACT

A method for providing a challenge user interface for an enterprise social network including users associated with an entity. The method can include receiving a request to select a specific challenge from a list of challenges a user is a participant and displayed on a user system associated with the user. Information associated with the selected challenge including points associated with an action can be obtained from one or more databases. The specific information can be transmitted to the user system for display. An action associated with the specific challenge can be received. A user profile associated with the user can be obtained from the one or more databases. In response to receiving the action, a total points parameter associated with the profile can be updated in response to receiving the action. The updated total point value can be stored in the one or more databases.

20 Claims, 24 Drawing Sheets

(56) References Cited

U.S. PATENT DOCUMENTS

| | | |
|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 * | 4/2010 | Beaven et al. ............ 705/7.27 |
| 8,024,334 B2 * | 9/2011 | Petras et al. ............ 707/728 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0320035 A1 * | 12/2009 | Ahlgren et al. ............ 718/104 |

* cited by examiner

FIG. 2B

Home | About Me | Recognitions | Challenges | Challenge Templates | +

Cheryl Porro
About Me | My Feedback | My Recognitions | My Stats | My Challenges The next time I am out of the office is: 2011-04-18

Summary | Edit — 204
My main responsibility is running the Platform QE team. I also work on the Team Sunshine, OOM, ADM, and OAForce teams.

Future | Edit — 208
I would like to spend more time in front of customers.

Current
- Sr. Director, Quality Engineering reporting to Rajani Ramanathan
- I tend to spend 20.0% of my time with team Workflow and Process Admin as a QA Manager 20.0% of my time with team Declarative App Builder as a QA Manager 20.0% of my time with team Application Distribution as a QA Manager 15.0% of my time with team Globalization Manager 10.0% of my time with team Dimensions as a QA Manager 5.0% of my time with team QAForce as a Scrum Master 0.0% of my time with team Process Engine as a QA Manager 0.0% of my time with team ADM 2.0 as a Other 10.0% of my time with team Custom Schema as a QA Manager 0.0% of my time with team Core Schema as a QA Manager
- My Last checkin was related to: Auto-assignments (Add back assignee for App Dist).
- Tasks on today's todo list include: ask Pos if they would be interested in providing feedback, categorize and send to team for feedback. get invite together and out Past

Areas of Expertise
- Auto-Assignments
- Workflow Approvals

Recent Checkins
- 06/17/2008 22:06 PM Add back QA assignee...
- 04/29/2008 05:04 AM Test Bugforce Assign...
- 04/29/2008 05:04 AM Updated Plat QA Auto...
- 04/29/2008 05:04 AM Annotate tests for Q...
- 04/28/2008 23:04 PM make josh qa for app...

| 104 | 106 | 108 | 110 | 111 | 112 |
|---|---|---|---|---|---|
| Home | About Me | Recognitions | Challenges | Challenge Templates | + |

<<back to all challenges — 402

Run in a Fun Race — 406

410 — Description A 5K Charity Race — 412     408 — Record an Action
418 — End Date 3/19/2011 — 420                    414 — Start Date 1/19/2011
426 — Points Per Action 10 — 428                  422 — Action Run a race, get 10 points
                                                  430 — Participants in Challenge 10

434 — Write something...
      Attach  📎 File  🔗 Link
      438  440  444  448                    636 — Share 446 — Cheryl Porfo I just earned 10 points for completing an activity in this
      challenge on 4/13/2011!
      Yesterday at 12:36 PM · Comment · Like
      450            452        454

My Stats

Number of Points | Number of Actions | Leaderboard Position
458 / 30 — 460   | 462 / 3 — 464     | 466 / 2 — 468

LEADERBOARD

472 — 1  ☐  Lanini Arunachalam — 476
           40 points — 480
     474      478

2  ☐  Joshua Newman
           30 points

3  ☐  Cheryl Porro
           30 points

Herman Kwong
20 points

4  ☐  Ron Hess
           10 points

4  ☐  Sahana Mysore
           10 points

5  ☐  Dan McGrey
           0 points

Jonathan Hersh
0 points

5  ☐  Brian Zotter
           0 points

5  ☐  Peter Wang
           0 points

*FIG. 4B*

| | | Home | Challenges | Challenge Templates | + | | | | |
|---|---|---|---|---|---|---|---|---|---|
| | | My Challenges | Challenges I Own | All PublicChallenges | | | | | |
| | | My Challenges | | New | | | | | |
| | | | Challenge | | Owner | Start Date | End Date | Participants |
| View | Record an Action | Leave a Challenge | Run in a Fun Race | | Ron Hessr | 1/19/2011 | 3/19/2011 | 10 |
| View | Record an Action | Leave a Challenge | Q1 2012 DB.com spiff | | Joshua Newman | 2/1/2011 | 4/30/2011 | 4 |
| View | Record an Action | Leave a Challenge | Q1 2012 Heroku spiff | | Lahiri Arunachalam | 2/1/2011 | 4/30/2011 | 2 |
| View | Record an Action | Leave a Challenge | QAForce Test: Plan Challenge | | Cheri Porro | 3/16/2011 | 4/29/2011 | 3 |
| View | Record an Action | Leave a Challenge | Gack Master! | | Cheri Porro | 3/16/2011 | 4/22/2011 | 1 |
| View | Record an Action | Leave a Challenge | Q1 Leads | | Cheri Porro | 3/18/2011 | 3/1/2013 | 3 |
| View | Record an Action | Leave a Challenge | 172 Release Retrospectives | | Andrea Leszek | 3/24/2011 | 4/22/2011 | 9 |
| View | Record an Action | Leave a Challenge | Q2FY11 Foundation Challenge | | Cheri Porro | 5/1/2011 | 7/31/2011 | 1 |
| View | Record an Action | Leave a Challenge | Fresh Challenge Q1 | | Cheri Porro | 2/1/2011 | 5/31/2011 | 4 |
| View | Record an Action | Leave a Challenge | Q1 Fish Catching Challenge! | | Cheri Porro | 4/1/2011 | 5/31/2011 | 10 |

*FIG. 6B*

| Home | About Me | Recognitions | Challenges | Challenge Templates | + |

Select Challenge Template

▽ Choose an Existing Category

Template [Choose a Template ▽]    [Select and Continue]

▽ Or Create a New Template

Challenge Template Name [Choose a Template ▽]

Description [          ]    Action [          ]

Points Category [None ▽]

Points Per Action [Choose a Template ▽]    Type of Points [None ▽]

[Save and Continue]

METHODS AND SYSTEMS FOR PROVIDING A CHALLENGE USER INTERFACE FOR AN ENTERPRISE SOCIAL NETWORK

CLAIM OF PRIORITY

This application claims the benefit of U.S. Provisional Patent Application 61/444,544, entitled METHODS AND SYSTEM FOR APPLYING GAME MECHANICS TO AN ENTERPRISE SOCIAL NETWORK, by Porro et al., filed Feb. 18, 2011, the entire contents of which are incorporated herein by reference.

FIELD OF THE INVENTION

One or more implementations relate generally to methods and system for providing a challenge user interface for an enterprise social network.

BACKGROUND

Enterprise social networks can include consumer social networks, for example, Facebook® and Twitter® have been specially adapted to or adopted by an enterprise, or can include social networks specifically designed for the enterprise environment. For example, Chatter®, which is offered by salesforce.com, inc. of San Francisco, Calif., is an example of an enterprise social network that can be adapted or adopted by an enterprise. Social networks often contain large amounts of data for each user, because each user can contribute, collaborate, and share information with other social network users. In the enterprise environment, this information can include postings on the status of a deal or project, short summaries of what the posting user is doing, and/or public online conversations about a certain topic on a feed or "wall." Because this information is published to a social network, the information can provide a false value to the social network, e.g., the most "influential" user. For example, an influential user can have a large number of followers, or may publish postings that are re-published to others users and/or are often receive the largest number of comments.

While following or commenting on another user's posts is one way to identify influential users, this measure of influence is only related to content posted on a user's feed. In other words, influence is directly related to actions by the user on the social network. However, this may not provide a complete picture of the user's value to the enterprise. For example, a user may have a large amount of time to post and not actually perform the user's expected tasks on behalf of the enterprise. In addition, the enterprise social network may not capture all of the employee's activities that merit recognition. For example, if an employee helps another employee on a project but the project does not have related content on an enterprise social network, or neither employee mentions that another employee helped with a project, this collaboration may not be recorded on the enterprise social network. As a result, it would be helpful to motivate recordings of such mutually beneficial conduct on the enterprise social network, so that such work can be recognized and possibly rewarded for the employee's actions. Alternatively or additionally, an employee may be helping others on projects that are unrelated to that employee's primary job responsibilities. Such generous acts would likely not be traceable, either on the enterprise social network or otherwise. Therefore, providing a forum for awarding employees for work outside of their primary job responsibilities and/or awarding employees who went above and beyond their primary job responsibilities would be beneficial. Such a forum for providing a recognition forum for employees regardless of job title, such that peers or employees can recognize each other's achievements would be beneficial and can create a more pleasant work environment.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 2B is a screenshot of an about me user interface for an enterprise social network in accordance with an exemplary embodiment;

FIG. 4B is a screenshot of a challenge user interface for an enterprise social network in accordance with an exemplary embodiment;

FIG. 6B is a screenshot of a my challenge user interface for an enterprise social network in accordance with an exemplary embodiment;

FIG. 15 is a flowchart for a method for reviewing my stats information related to a user of an enterprise social network in accordance with an exemplary implementation;

FIG. 18 is a screenshot of a new challenge user interface having entered data in accordance with an exemplary embodiment;

DETAILED DESCRIPTION

Figure 1A:
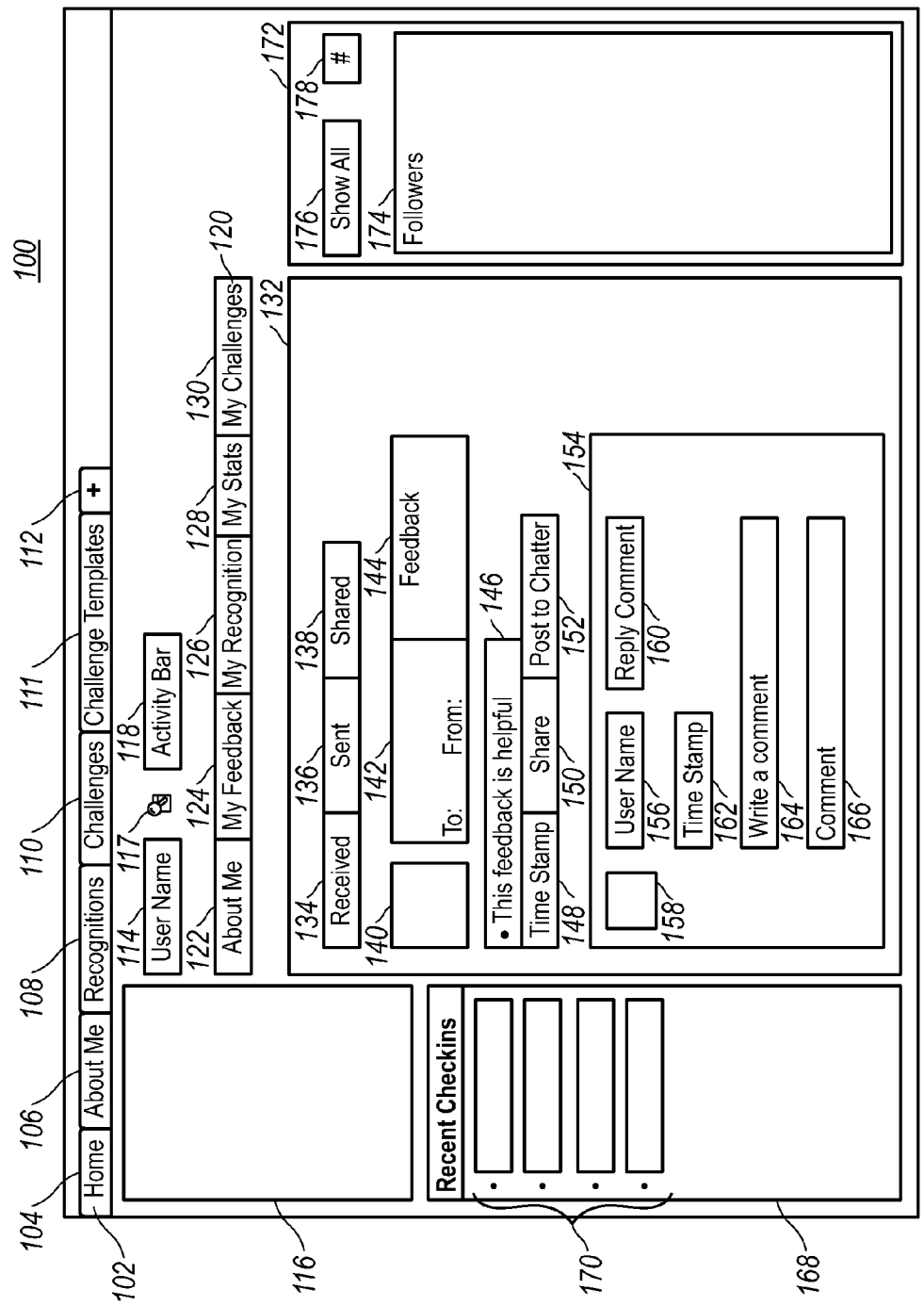
FIG. 1A is a block diagram screenshot of an ongoing feedback user interface for an enterprise social network in accordance with an exemplary embodiment.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

General Overview

Systems and methods are provided for one or more user interfaces for an enterprise social network. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing one or more user interfaces for an enterprise social network will be described with reference to exemplary embodiments. The one or more user interfaces can include, but is not limited to, an ongoing feedback user interface, an about me user interface, a recognition user interface, a challenge user interface, and a my stats user interface. One or more of the user interfaces can apply game mechanics to an enterprise social network described herein which can provide for increased incentive behavior for users of the enterprise social network. A benefit of the ongoing feedback user interface is a user is able to receive ongoing feedback in a timely manner. A benefit of the about me user interface is a user can obtain accurate information about another user, such as technical ability. A benefit of the recognition user interface is a user can be recognized for an action that can be outside of the user's assigned work tasks. A benefit of the challenge user interface is users can participate in a challenge and generate friendly competition amongst co-workers. A benefit of the my stats user interface is a user can review his or her performance.

The one or more user interfaces for the enterprise social network described herein can be provided to a user through a user device, which can include, but is not limited to a computer device, an electronic tablet, a smart phone, portable computer, a mobile electronic device or other electronic devices. For example, one or more user interfaces for the enterprise social network can be provided to the user via a website, a phone application, a web application, a browser application, a locally downloaded software application, a software program stored on a machine-readable medium, or any application program downloadable and displayable on a user system.

The one or more user interfaces for the enterprise social network can include one or more applications or features which can include, but are not limited to, ongoing feedback, about me, recognition, challenge, and my stats, all of which are described herein. The ongoing feedback application can provide a user interface for a user to receive ongoing feedback associated with a user, send ongoing feedback about another user, and share the user's ongoing feedback with other users of the enterprise social network. Ongoing feedback can refer to feedback associated with a user and is provided to the user in a timely manner, such as minutes, hours or within days, after the user performs one or more tasks or actions. Thus, the user can review and/or comment on the feedback on a recently completed task or action while the task or action is still fresh in the user's mind as well as the user who provided the feedback. The user can review the user's own ongoing feedback and/or another user's "publically" available ongoing feedback. Publically available ongoing feedback is ongoing feedback that the user has permitted to be viewed by other users of the enterprise social network.

The about me application can provide a user interface for a user to provide information about the user to one or more users of the enterprise social network. The information can include a summary of the user's work experience, future work experience, current work experience, past work experience, and the user's expertise. The user can provide some of the information, such as the summary of the user's work experience and future work experience, and the other information, such as current work experience, past work experience, and the user's expertise can be provided by one or more external programs. For example, for a programmer, the user's work expertise can be provided based on the software modules the user accessed.

The recognition application can provide a user interface for a user to review recognition awarded to the user from one or more other users of the enterprise social network as well as to award recognition to one or more users of the enterprise social network. Recognition can be awarded for one or more tasks or actions by a user, such as performing a task or action that is outside of the user's normal job description. A recognition leader board can display a ranking of users based on the amount of recognition that has been awarded to each ranked user.

The challenge application can provide a user interface for a user to review and/or participate in one or more challenges. A challenge can be related to one or more actions, such as participating in a charity race or wagering when a sale can be completed. A user can be rewarded points in accordance with completing the challenge. A challenged leader board can be displayed ranking the users based on how many points each ranked user received for completing one or more actions associated with one or more challenges.

Referring to FIG. 1A, a block diagram screenshot of an ongoing feedback user interface for an enterprise social network in accordance with exemplary embodiment is illustrated. In one or more embodiments, the ongoing feedback user interface 100 can include the same fields, different fields or additional fields. As shown, the ongoing feedback user interface 100 can allow a user to review ongoing feedback associated with the user. The ongoing feedback user interface 100 can include an application taskbar 102. The application taskbar 102 can include links to one or more applications for the enterprise social network. The links can include a home link 104, about me link 106, recognitions link 108, challenges link 110, and challenge templates link 111. These links can provide access to each of the associated applications or features. In this exemplary embodiment, the home link 104 can provide access to the ongoing feedback application. In one or more embodiments, the home link 104 can be associated with a different application and the feedback application can have a separate link, such as a Feedback link (not shown). The application taskbar 102 can include a taskbar option (shown as a "+") 112, which can allow the user to modify the application taskbar 102, such as adding or deleting one or more links, or designating a different application as the home link 104.

The ongoing feedback user interface 100 can display a user name field 114, an image field 116 associated with user, a search link 117, and an activity bar 118. The user name field 114 can display the name of the user who is associated with the information being displayed. The image field 116 can include an image associated with the user. The image can include an electronic photo, avatar or any other visual image associated with the user. The search link 117 can allow the user to view information associated with another user. For example, in response to the search link 117 being selected, a popup window (not shown) can be displayed. The user can enter the name of another user to view information associated with the entered name. Once entered, the ongoing feedback associated with the entered user name can be displayed. In one or more embodiments, as explained below, the ongoing feedback that the user permitted to be shared with other users of the enterprise social network can be displayed. In one or more embodiments, the information displayed can be for another application, such as the about me information associated with the entered user name. The ongoing feedback user interface 100 can include an activity bar 118 which can provide information regarding the availability of the user. The availability of the user can be obtained from a calendar associated with the user.

The ongoing feedback user interface 100 can include a personal links bar 120 having one or more links, including but not limited to, about me link 122, my feedback link 124, my recognition link 126, my stats link 128, and my challenge link 130 which are discussed in further detail below. Each of these links provides information associated with the user that is displayed in the user name field 114.

The ongoing feedback user interface 100 can include a feedback section 132. The feedback section 132 can include ongoing feedback associated with the user. The feedback section 132 can include one or more ongoing feedback streams. An ongoing feedback stream can include the original comment and any reply comments. The feedback section 132 can include a received link 134, sent link 136, and shared link 138. The received link 134 can be the default link. When the received link 134 is designated, ongoing feedback streams directed to the user can be displayed. When the sent link 136 is designated, ongoing feedback streams that were originated by the user and directed to another user can be displayed. When the shared link 138 is designated, ongoing feedback streams that the user permitted to be shared with other users of the enterprise social network can be displayed.

When the received link 134 is designated, one or more ongoing feedback streams can be displayed. The ongoing feedback stream can include an image field 140, a to/from field 142, an ongoing feedback field 144, a timestamp field 148, a Share link 150, and a Post to Chatter link 152. The image field 140 can include an image associated with the user who sent the ongoing feedback. The image can be an electronic photo, avatar or any other visual image associated with the user. The to/from field 142 can include the name of the user who received the ongoing feedback and the name of the user who sent the ongoing feedback. The ongoing feedback field 144 can include the ongoing feedback. The ongoing feedback user interface 100 can include a "The Feedback is Helpful" link, which when selected, notifies the user who provided the ongoing feedback with a message informing the user that the ongoing feedback was helpful to the receiving user. The message can be an email message, a posting on a social network such as Chatter®, or any other electronic messaging system. The timestamp field 148 can be the time the ongoing feedback stream was sent and can include the date and time. The share link 150 can allow the user to permit the sharing of the comment stream with other users of the enterprise social network. A comment stream can include the initial ongoing feedback comment as well as any reply comments. The comment stream can include reply comments from others users, in the event the user who received the initial ongoing feedback has granted permission for others to review the comment stream. For example, if a user of the enterprise social network accesses the ongoing feedback application, the user can review one or more ongoing feedback streams that another user has permitted to be shared. Once an ongoing feedback stream is permitted to be shared, the entire ongoing feedback stream can be reviewed. The post to Chatter field 152 can allow the ongoing feedback comment to be posted to Chatter® or any other designated social network.

The feedback section 132 can include a reply comment section 154. The reply comment section 148 can include one or more reply comments in an ongoing feedback stream. A reply comment can be a reply to feedback or another reply comment. The reply comment section 154 can include a user name field 156, an image field 158, a reply comment field 160, a timestamp field 162, a write a comment field 164, and a comment button 166. The user name field 156 can include the name of the user sending the reply comment. The image field 158 can include an image associated with the user who sent the reply comment. The image can be an electronic photo, avatar or any other visual image associated with the user. The reply comment field 160 can include the reply comment. The timestamp field 162 can be the time the reply comment was sent and can include the date and time. The write a comment field 164 can include an entry box which allows the user to enter a reply comment. The comment button 166 can be designated to send the reply comment to the user who sent the ongoing feedback comment or who sent a reply comment.

The ongoing feedback user interface 100 can include a recent checkins section 168 which lists one or more recent software modules 170 that the user has checked in. The recent checkins section 168 can be populated by one or more software systems, external to the enterprise social network. The external software system can be GU-OS CRM sold by salesforce.com of San Francisco, CA. In other embodiments, the external software systems can include time entry software, document management systems, or any other external software system that similar information can be obtained. In one or more embodiments, the recent checkins section 168 can list one or more projects 170 the user has recently worked on and can be populated by other external software programs, such as a time entry program.

The ongoing feedback user interface 100 can include a followers section 172 which can include a list of one or more followers 174 of the user, a show all button 176, and a number field 178. The list of followers 174 can be limited to the number of followers that can fit in the followers section 172. The list of followers 174 can include an image of each follower. The image can be an electronic photo, avatar or any other visual image associated with the user. In one or more embodiments, a name field (not shown) can be displayed in which the name of the user associated with the image is displayed. The show all button 176 can result in images of all of the followers of the user being displayed. The number field 178 displays the number of followers that are associated with the user.

Figure 1B:
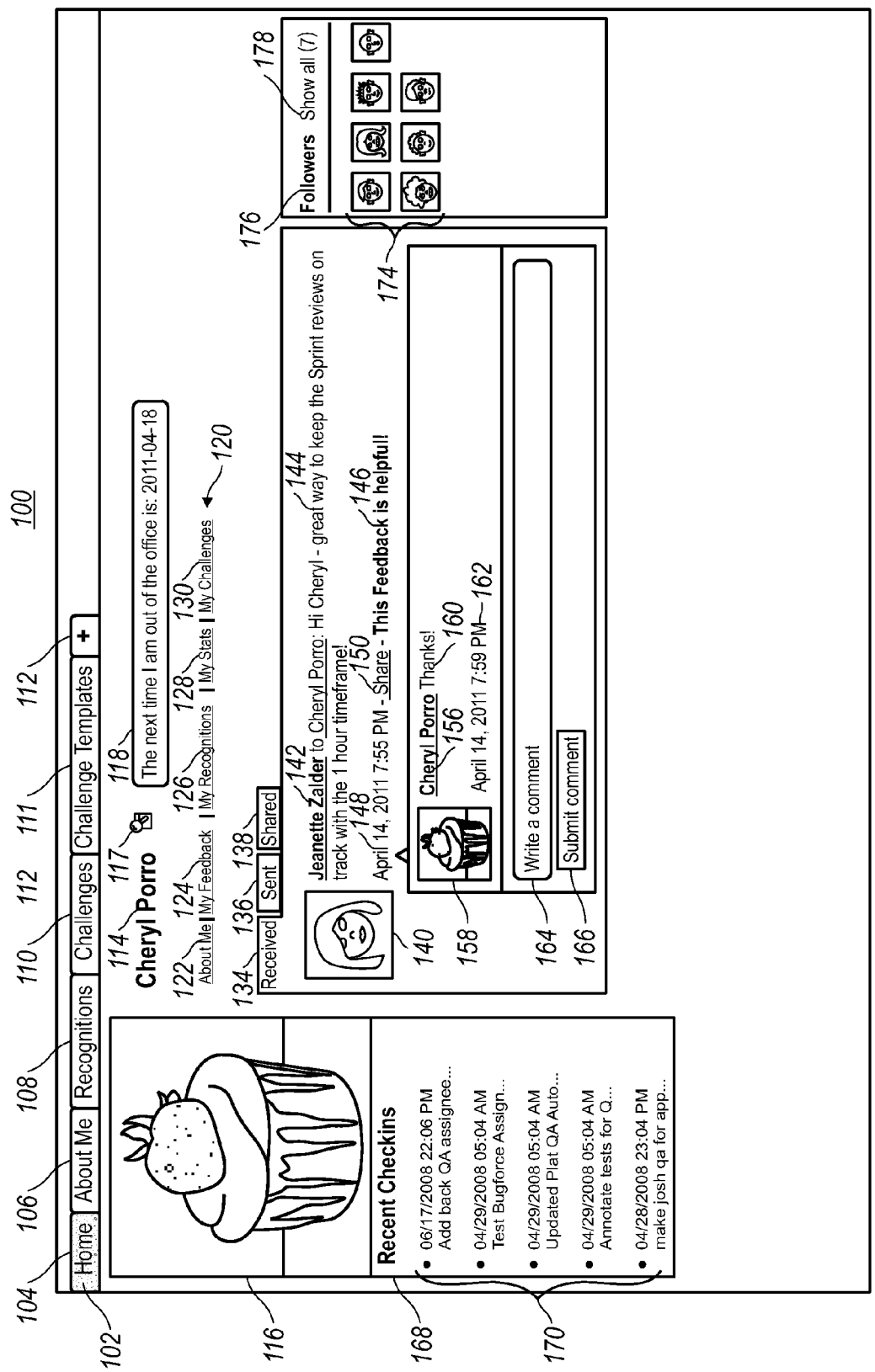
FIG. 1B is a screenshot of an ongoing feedback user interface for an enterprise social network in accordance with an exemplary embodiment.

Referring to FIG. 1B, a screenshot of an ongoing feedback user interface for an enterprise social network in accordance with exemplary embodiments is illustrated. As shown, the user is Cheryl Porro 114 and she has one comment stream. The ongoing feedback comment 144 is from Jeanette Zalder to Cheryl Porro 142. The ongoing feedback comment is "Hi Cheryl—great way to keep the Sprint reviews on track with the 1 hour timeframe!" 144. The ongoing feedback comment was sent on "Apr. 14, 2011 7:55 PM" 148. Cheryl Porro sent a reply comment, "Thanks" 160. The reply comment 160 was sent on "Apr. 14, 2011 7:59 PM" 162. Cheryl Porro has seven followers in the followers field 174. Cheryl Porro has five (5) modules listed in the recent checkins 168 section. Each of the listed modules includes a timestamp showing when the modules were checked in.

Figure 2A:
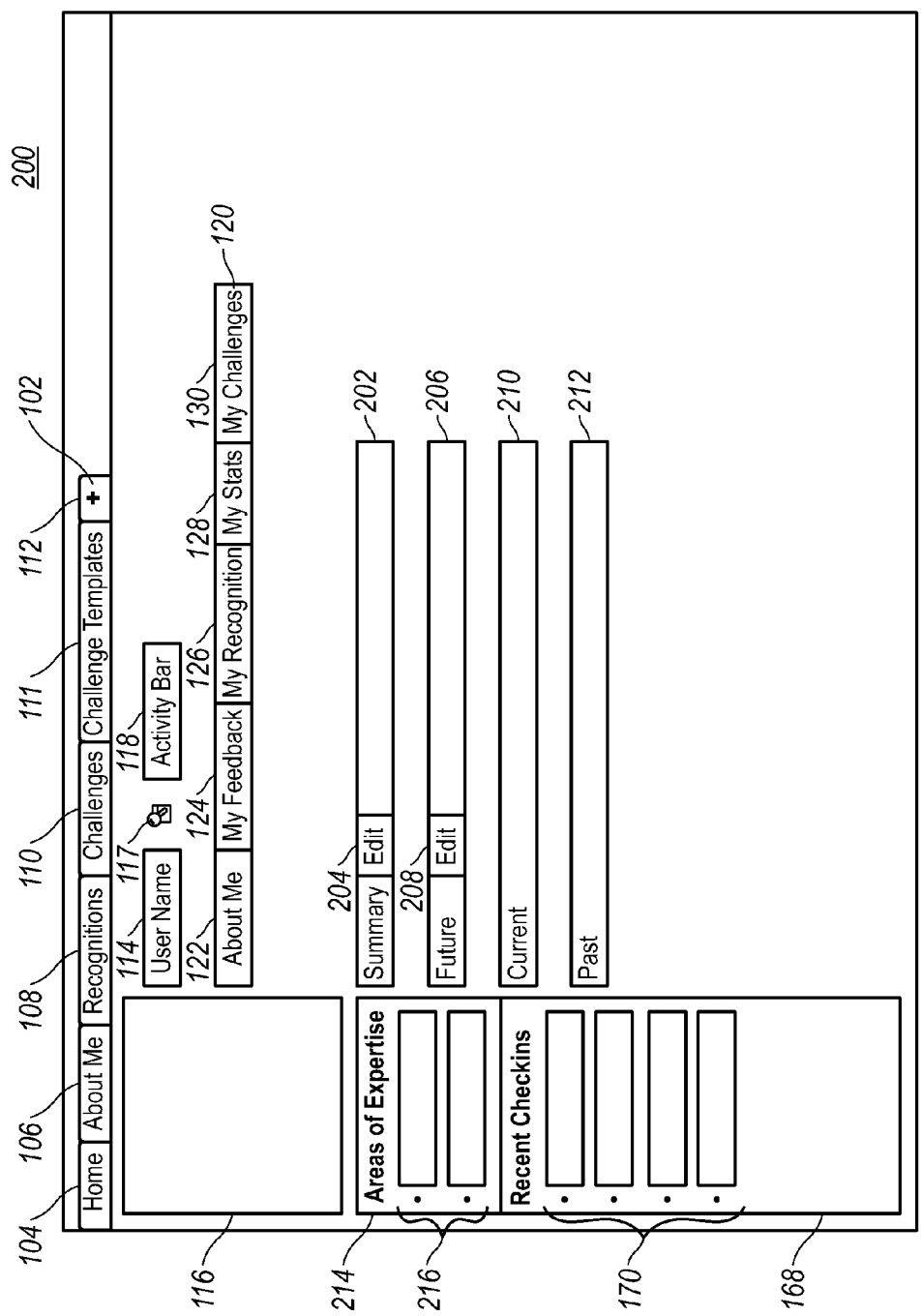
FIG. 2A is a block diagram screenshot of an about me user interface for an enterprise social network in accordance with an exemplary embodiment.

Referring to FIG. 2A, a block diagram screenshot of an about me user interface for an enterprise social network in accordance with exemplary embodiment is illustrated. In one or more embodiments, the about me user interface 200 can include the same fields, different fields or additional fields as shown in FIG. 2A. The about me user interface 200 can allow a first user to review information about the first user or another user. To view the about me information associated with another user, the user can select the search link 117, enter a user name in the popup window (not shown) to search for ongoing feedback associated with the entered user name. Once entered, the about me information associated with the entered user name can be displayed. As shown, the about me user interface 200 can include an application taskbar 102, a user name field 114, an image field 116, a search link 117, an activity bar 118, and a personal links bar 120 which were described earlier.

The about me user interface 200 can include a summary field 202, future field 206, current field 210, and past field 212. The summary field 202 can include a summary of the user's responsibilities. The future field 206 can include one or more comments on the work the user would like to work on the future. The summary field 202 and future field 206 can be entered by the user and the user can use the edit button 204, 208 to revise the text as desired by the user. The current field 210 can include projects the user is currently working on an dcan include the percentage of time the user works on each project. The current field 210 can be populated by one or more software programs external to the about me application. The populated information can include, but is not limited to, title, supervisor names, percentage of time worked on each project, last project worked on, and tasks for the day. The tasks for the day can be obtained from an external calendar software program. The external software system can be GU-OS CRM. In other embodiments, the external software systems can include time entry software, document management systems, or any other external software system that similar information can be obtained. The past field 212 can be populated by one or more software programs external to the about me application. The external software system can be GU-OS CRM. In other embodiments, the external software systems can include time entry software, document management systems, or any other external software system that similar information can be obtained.

The about me user interface 200 can include an areas of expertise section 214 and a recent checkins section 168. The areas of expertise section 214 can be populated by one or more external software programs. The external software system can be GU-OS CRM. In other embodiments, the external software systems can include time entry software, document management systems, or any other external software system that similar information can be obtained. The recent checkins section 168 can include a list of software projects that the user has recently checked into one or more external software programs.

The information in the about me user interface 200 can assist another user in determining the skill sets of the user. The summary field 202, future field 206, current field 210, past field 212, as well as the areas of expertise field 214 and recent checkins field 168 can provide the another user an understanding of the type of work, projects and experience of the user to assist the another user in determining if the user can assist on one or more projects. By having one or more fields populated by the one or more external software programs, another user can obtain a realistic appreciation of the skill sets of the user compared to traditional methods for obtaining similar information about a user. For example, traditional methods can include a webpage associated with the user in which the user typically enters the information. As a result, the information can contain inaccuracies and/or puffery information which can provide an inaccurate expectation of the skill sets of the user. The information obtained from traditional methods can also be outdated, thus another user may not be able to obtain a complete perception of the user's skill sets.

Referring to FIG. 2B, a screenshot of an about me user interface for an enterprise social network in accordance with exemplary embodiments is illustrated. As shown, Cheryl Porro 114 is a computer programmer. Her summary recites, "My main responsibility is running the Platform QE team. I also work on the Team Sunshine, OOM, ADM, and OAForce teams." 202. Her future summary recites, "I would like to spend more time in front of customers." 206. Her current summary recites four entries. The first entry is "Sr. Director, Quality Engineering to Rajani Ramanathan." 210. The second entry is "I tend to spend 20.0% of my time with team Workflow and Process Admin as a QA Manager 20% of my time with team Declarative App Builder as a QA Manager 15.0% of my time with team Globalization Manager 10% of my time with team Dimensions as a QA Manager 5% of my time with team Process Engine as a QA Manager 0.0% of my time with team ADM 2.0 as a Other 10% of my time with team Custom Schema as a QA Manager 0.0% of my time with team Core Schema as a QA Manager." 210 The third entry is "My Last checkin was related to: Auto-assignments (Add back assignee for App Dist)." 210. The last entry is "Tasks on today's todo list include: ask Pos if they would be interested in providing feedback, categorize and send to team for feedback, get invite together and out." 210. The about me user interface 200 also lists two areas of expertise 214, Auto- Assignments and Workflow Approvals 216. Under the recent checkins 168, Cheryl Porro has checkedin five software modules. The dates and time of the software modules and associated information about the software module can be shown. In reviewing the information on the About me user interface 200, another user can obtain a better understanding for the skill sets of Cheryl Porro and can access the underlined items which can be links to allow the another user to obtain more information about the projects. For example, a user can contact Rajani Ramanathan to obtain additional information about Cheryl Porro.

Figure 3A:
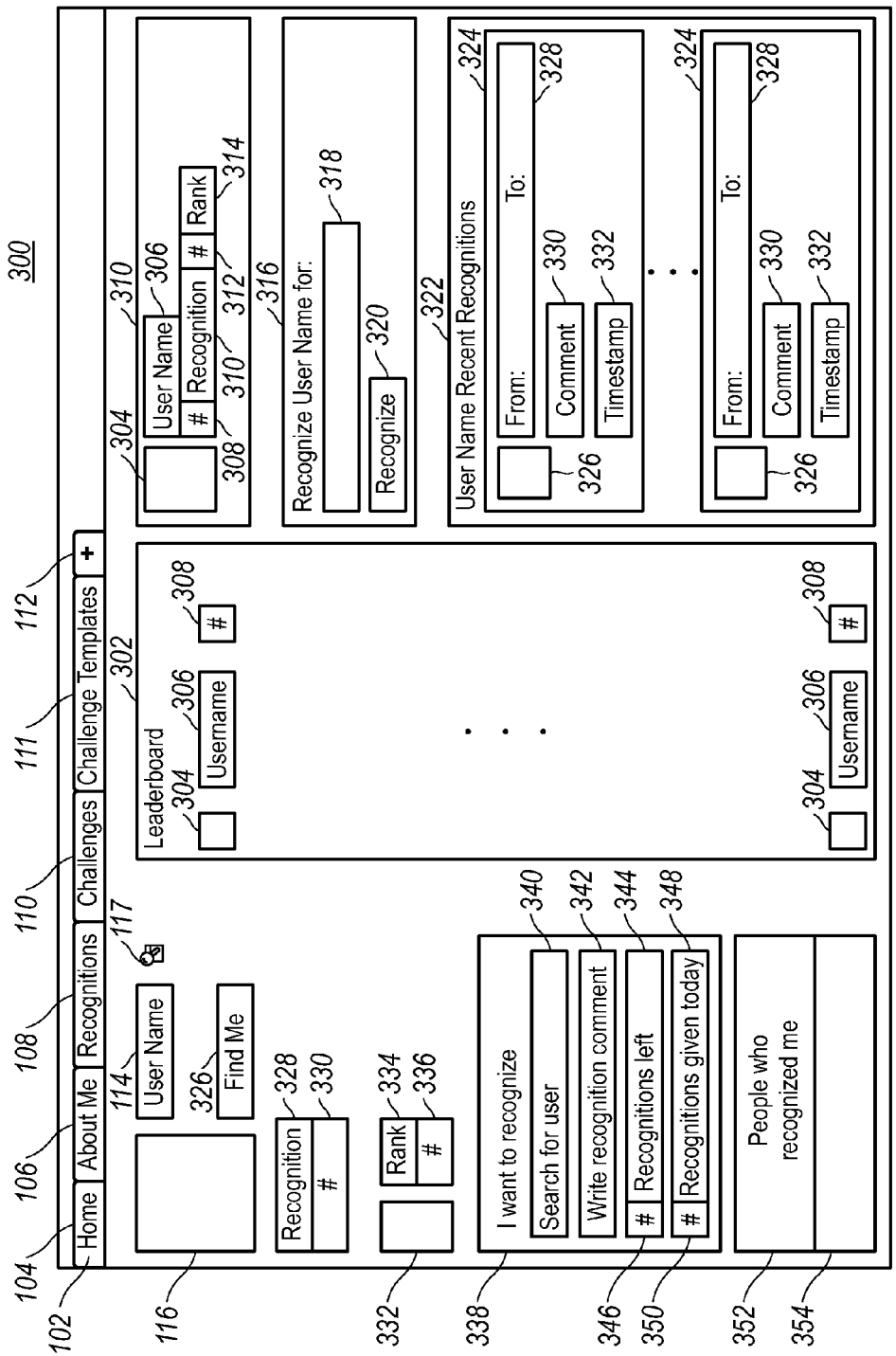
FIG. 3A is a block diagram screenshot of a recognition user interface for an enterprise social network in accordance with an exemplary embodiment.
Figure 3B:
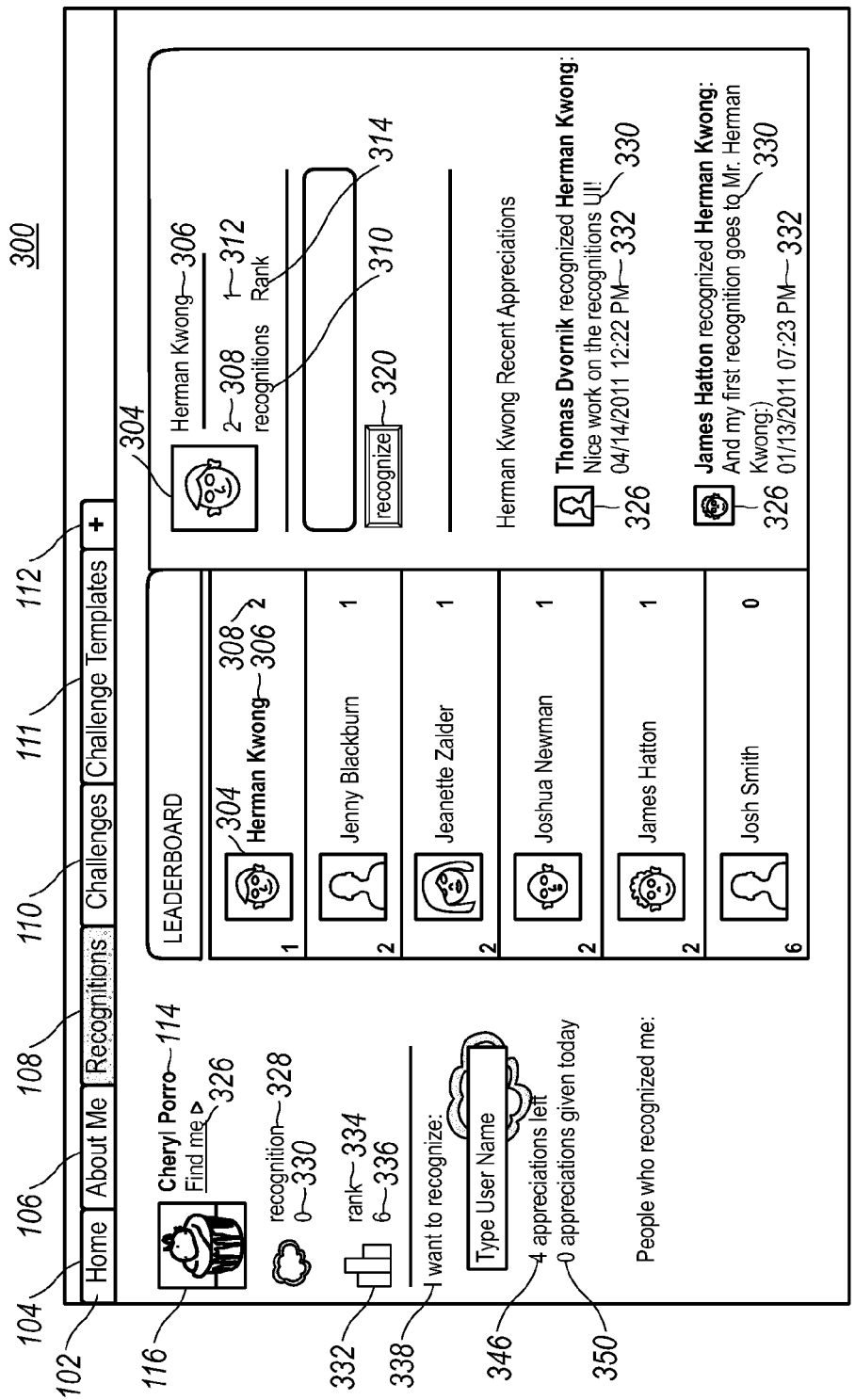
FIG. 3B is a screenshot of a recognition user interface for an enterprise social network in accordance with an exemplary embodiment.

Referring to FIG. 3A, a block diagram screenshot of a recognition user interface for the enterprise social network in accordance with an exemplary embodiment is illustrated. In one or more embodiments, the recognition user interface 300 can include the same fields, different fields or additional fields as shown in FIG. 3A. The recognition user interface 300 can provide a user interface to allow a user to review recognition associated with a user, the recognition leader board, comments associated with a user being recognized, and people who have recognized the user. The user can use the recognition user interface 300 to recognize users in the enterprise social network. Awarding recognition or appreciation to other users in the enterprise social network can promote congeniality. For example, as shown in FIG. 3B, Herman Kwong was awarded recognition for the recognition user interface which was outside of Herman Kwong responsibilities. In one or more embodiments, a user can receive recognition for an action within responsibilities associated with the user, for an action outside responsibilities, or any combination thereof. As shown, the recognition user interface 300 can include an application taskbar 102, a user name field 114, and an image field 116 which were described earlier.

The recognition user interface 300 can include a leader board section 302 which displays an ordered list of users and the number of recognitions associated with each listed user. The ordered list can be displayed in descending order. For each listed user, an image field 304, user name field 306 and the number of recognitions 308 the user has received can be displayed. In one or more embodiments, the list can be a partial list to fit in the page and can include functionality to review additional partial lists. The recognition user interface 300 can include information associated with a user on the leader board.

The information can include a ranking information section 310, a recognition section 316 and a comment section 322. The ranking information section 310 can include ranking information associated with a designated user. The ranking information section 310 can include an image field 304, user name field 306, number of recognitions field 310, and rank field 314. The image field 304 can include an image associated with a designated user from the leader board. The image can be an electronic photo, avatar or any other visual image associated with the user. The user name field 306 can include the name of the designated user. The number of recognitions field 310 can include a recognition number field 308 which lists the number of recognitions the user has received. The rank field 314 can include a rank number field 312 which lists the rank of the user. The recognition section 316 can allow the user to recognize a designated user from the leader board. The recognition section 316 can allow a user to enter text into an entry field 318 and can use a recognize button 320 to recognize the designated user. The comment section 322 can include one or more recognition comments associated with the designated user. The recognition user interface 300 can include a "Find Me" link can be displayed and when selected, the user becomes the designated user and recognition associated with the designated user can be displayed.

Each recognition comment can include an image field 326, a from/to field 328, a recognition comment field 330 and a timestamp field 332. The image field 326 can include an image associated with the user who sent the comment. The image can be an electronic photo, avatar or any other visual image associated with the user. The from/to field 328 can include the user name of the user who sent the recognition comment and the user name of the user who received the recognition comment. The recognition comment field 330 can include the comment. The timestamp field 332 can be the time the recognition comment was sent and can include the date and time.

The recognition user interface 300 can include a recognition section 338 which allows a user to recognize another user in the enterprise social network. The recognition section 338 can include a search for user field 340, write recognition comment field 342, recognitions left field 344, and recognitions given today field 348. The search for user field 340 allows a user to search for another user to recognize. The write recognition comment field 342 allows a user to enter a comment associated with the recognition. The recognitions left field 344 can include a recognitions left number field 346 which lists the number of recognitions the user has left to recognize other users. A user can be given a set number of recognitions the user can give over a given time period, such as a week, month, quarter, year, or any other period. The recognitions given today field 348 can include recognitions given today number field which lists the number of recognitions the user has given today. In one or more embodiments, the number of recognitions given can be over a given time period, such as a day, week, month, quarter, year, or any other period. The recognition user interface 300 can include a "people who recognized me" section 352. The people who recognized me section 352 can include a people who recognized me field 354 which includes a list of users who recognized the user over the given period. The people who recognized me field 354 can include an image of the user, the user name who recognized the user or any combination thereof Although recognition has been described as recognition, in one or more embodiments, recognition awards may be in the form of points, other numerical indicators (such as stars), icons, badges, ranks, or other recognition methodology that can recognize a user's contributions. In addition, information on why recognition was awarded can be collected for employee evaluation purposes. This information can be used in conjunction with other employee performance information to provide a more complete picture of the employee's contributions to the enterprise. In other words, a recognition award from an employee's peer can suggest that the employee is working well with others, performing beyond peers' expectations, and adding value to the enterprise in ways that may typically be missed by the employee's superiors. Recognition can encourage positive employee behaviors, improve overall employee attitudes and motivations, and add a fun aspect to a workplace.

Referring to FIG. 3B, a screenshot of a recognition user interface for an enterprise social network in accordance with exemplary embodiments is illustrated. As shown, Cheryl Porro is the user 114, she has zero recognitions 328 and is ranked sixth 334. She has four (4) 346 recognitions left. Cheryl has not recognized anyone 350 for the given period: today. Cheryl has yet to be recognized 354. The recognition leader board 302 includes six users with the leader 304 being Herman Kwong 306 with two (2) recognitions 308. Jenny Blackburn 306, Jeanette Zalder 306, Joshua Newman 306, James Hatton 306, all being tied for second 304 with one (1) recognition 308 each. The recognition user interface 300 includes the recognition for the designated user: Herman Kwong 306. Herman has two (2) recognitions 308 and is ranked first 312. The latest recognition was from Thomas Dvornik who recognized Herman Kwong 328. The latest recognition comment is "Nice work on the recognitions UI!" 330. The timestamp for the recognition timestamp is "Apr. 14, 2011 12:22 PM" 332. The earlier recognition was from James Hatton who recognized Herman Kwong 328. The earlier recognition comment is "And my first recognition goes to Mr. Herman Kwong;)" 330. The timestamp for the recognition timestamp is "Jan. 13, 2011 07:23 PM" 332.

Figure 4A:
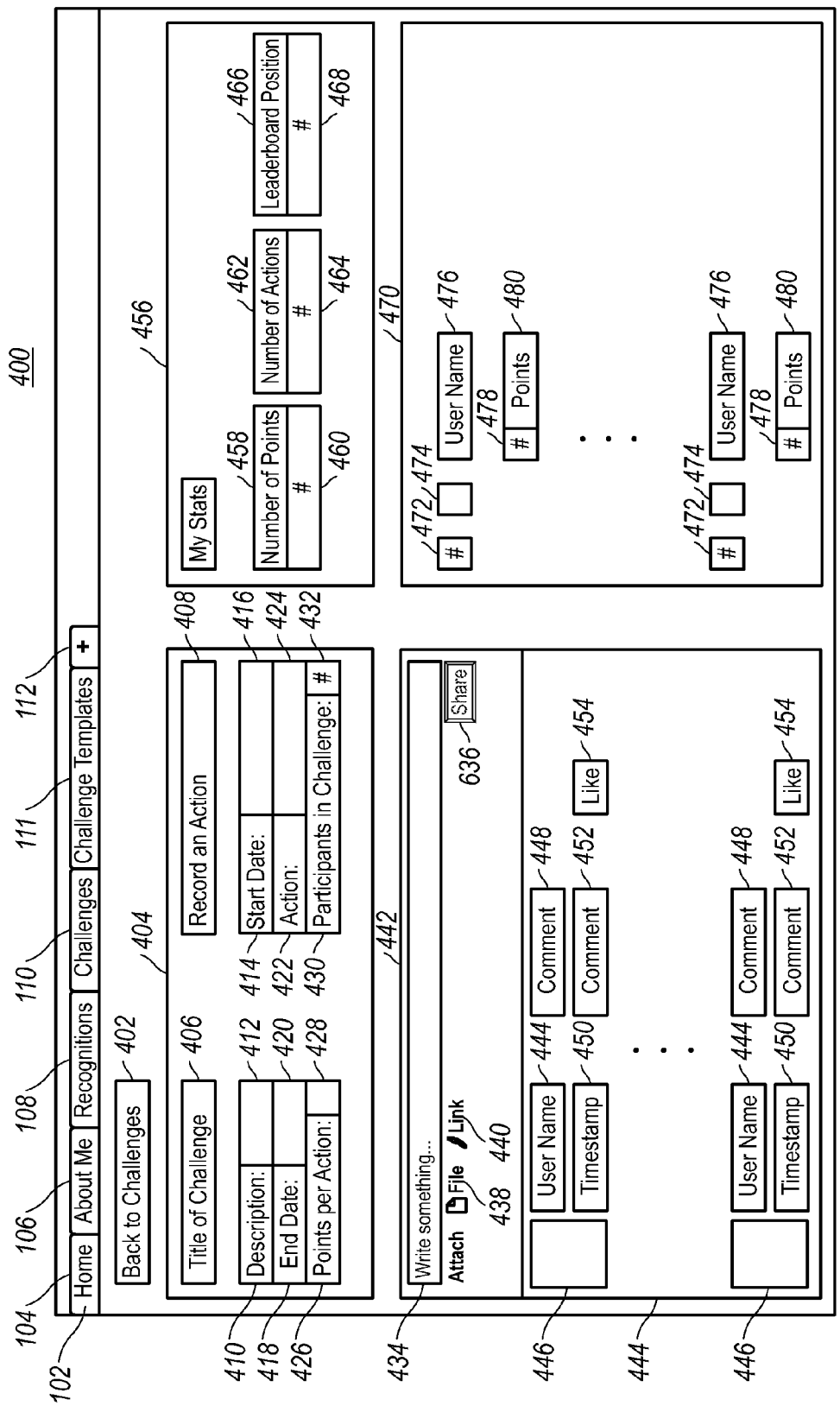
FIG. 4A is a block diagram screenshot of a challenge user interface for an enterprise social network in accordance with an exemplary embodiment.

Referring to FIG. 4A, a block diagram screenshot of a challenge application for the enterprise social network in accordance with exemplary embodiments is illustrated. In one or more embodiments, the challenge user interface 400 can include the same fields, different fields or additional fields. The challenge user interface 400 provides a user interface to allow a user to review a challenge, the user's challenge status, a challenge leader board, and can write a comment about a challenge. The challenge application can allow users to place friendly wagers to promote congeniality. A challenge can be for actions related to work, such as completing a sales job, or to actions outside of work, such as participating in a charity race. As shown, the challenge user interface 400 can include an application taskbar 102 which was described earlier.

The challenge user interface 400 can include a back to challenge link 402, a selected challenge section 404, a challenge comment section 442, a my stats section 456 and a challenge leader board section 470. The back to challenge link 402, when designated, can cause the display of a list of challenge which are described later. The selected challenge section 404 can include a title of challenge field 406, record an action link 408, a challenge description field 410, a challenge start date field 414, a challenge end date field 418, a challenge action field 422, a points per action field 426, and a participants in challenge field 430. The title of challenge field 406 can include a title of a challenge. The record an action link 408 can allow a user to record an action to earn points. The challenge start date field 414 can include a date for the start date of the challenge 416. The challenge end date field 418 can include a date for the end date of the challenge 420. The challenge action field 422 can include an action for which points can be awarded 424. The points per action field 426 can include a points field 428. The participants in challenge field 430 can include the number of users in the challenge 432.

The challenge comment section 442 can include a challenge comment field 434 for entering a comment. Once a comment is entered into the challenge comment field 434 the comment can be shared with others by designating a share button 636. The user can attach a file using a file button 438 and can attach a link using a link button 440. The challenge comment section 442 can include challenge comments with each challenge including a user name field 444, an image field 446, a comment field 448, a timestamp field 450, a comment button 452 and a like button 454. The user name field 444 can include the name of the user who commented on the challenge. The image field 446 can include an image associated with the user who sent the comment. The image can be an electronic photo, avatar or any other visual image associated with the user. The timestamp field 450 can be the time the comment was sent and can include the date and time. The comment button 452 can allow a user to comment about a posted comment when designated. The like button 454 can allow a user to provide an indicator that the user liked a comment.

The my stats section 456 can include statistics for the user and can include a number of points field 458 which include the number of points the user has earned 460, the number of actions field 462 which includes the number of actions the user has completed 464, and leader board position field 466 includes the rank of the user 468.

The challenge leader board section 470 can include an ordered list of users and the number of points each user has earned for listed user. The ordered list can be displayed in descending order. For each listed user, a rank field 472, an image field 474, a user name field 476, a number of points field 478 earned by the user can be displayed. The rank field 472 can include the ranking of the user based on points earned. The image field 474 can include an image associated with the user who sent the comment. The image can be an electronic photo, avatar or any other visual image associated with the user. The user name field 476 can include the name of the user earned the points. The number of points field 478 earned by the user can include the number of points earned by the user. In one or more embodiments, the challenge leader board can be a partial list to fit in the page and can include functionality to review additional partial lists.

Referring to FIG. 4B, a screenshot of a challenge user interface for an enterprise social network in accordance with exemplary embodiments is illustrated. As shown, the "Run in a Fun Race" can be the title 406 of the challenge. The description of the challenge can be "a 5k charity race" 412. The challenge start date can be "Jan. 19, 2011" 416 and can have ended "Mar. 19, 2011" 420. The action can be running in the race 424 and the user can earn 10 points 428 by running in the race. There are ten (10) users running in the race 432. Cheryl Porro 444 sent a comment "I just earned 10 points for completing an activity in this challenge on Apr. 13, 2011!" 448. Cheryl Porro can have earned a total of thirty (30) points 460 for completing three (3) actions 464 and can be ranked second 468. The leader board 470 can include ten (10) people with the leader 474 being Lanini Arunacchalam 476 who has forty (40) points 478. Joshua Newman 476 and Cheryl Porro 476 are tied for second 472 with thirty (30) points 478. Herman Kwong 476 is third 472 with twenty (20) points 478. Ron Hess 476 and Sahana Mysore 476 are tied for fourth 472 with ten (10) points 478. Dan McGrey 476, Jonathan Hersh 476, Brian Zotter 476, and Peter Wang 476 are tied for fifth 472 with no points 478.

Figure 5A:
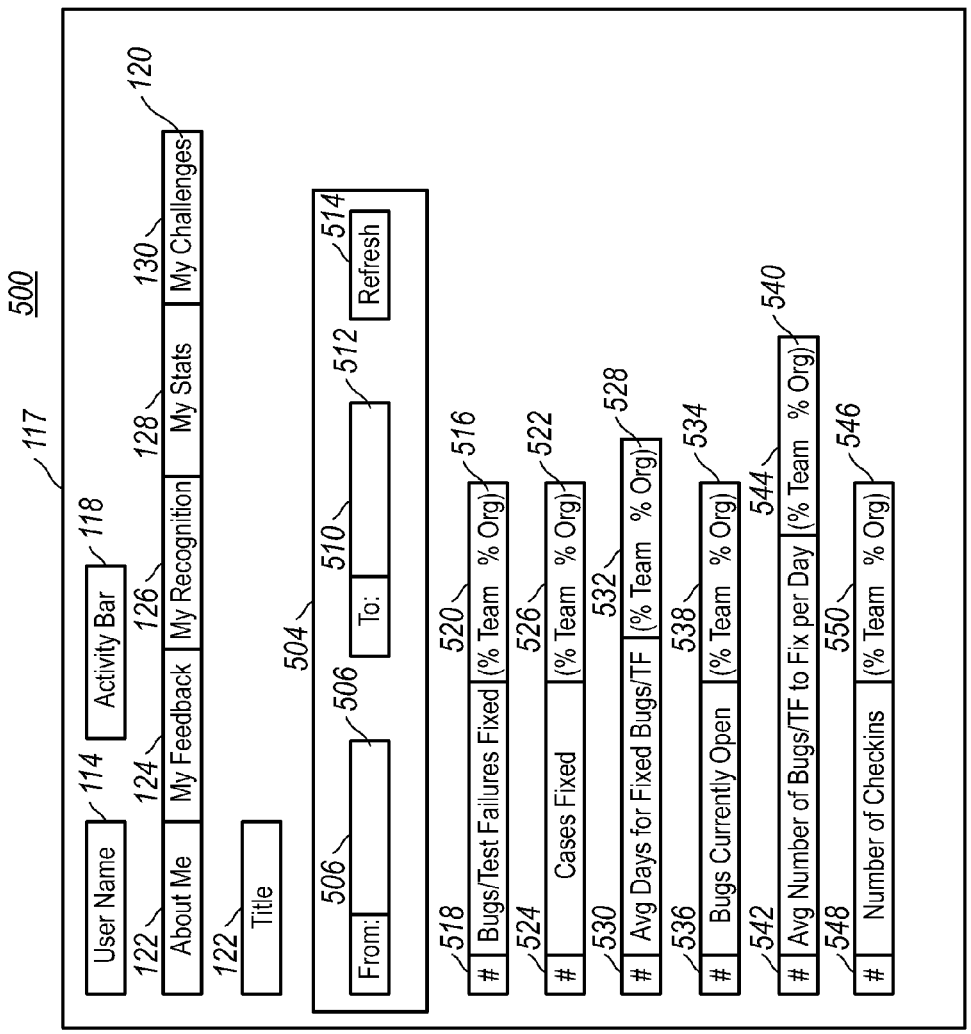
FIG. 5A is a block diagram screenshot of a my stats user interface for an enterprise social network in accordance with an exemplary embodiment.

Referring to FIG. 5A, a block diagram of the my stats user interface for an enterprise social network in accordance with an exemplary embodiment is illustrated. In one or more embodiments, the my stats user interface 500 can include the same fields, different fields or additional fields. The my stats user interface 500 can provide a user interface to allow a user to review statistics associated with a user for a given period. As shown, the my stats user interface 500 can include an application taskbar 102, a user name field 114, an image field 116, and an activity bar 118 which were described earlier. The my Stat user interface 500 can include a title field 122 which includes the job title for the user. The my Stat user interface 500 includes a date bar 405. The date bar 405 can include a from field 506, a to field 510, and a refresh button 514. The from field 506 can include a from date field 508. The to field 510 can include a to date field 512. The refresh button 514 allows the user to change the statistics based on the date in the from date field 508 and to date field 512. The my stats user interface 500 can include a bugs/test failures fixed field 516, a cases fixed field 522, an average days for fixed bugs/test failures field 528, a bugs currently open field 534, an average number of bugs/test failures per day field 540, and number of checkins field 546. These fields 516, 522, 528, 534, 540, 546 can be populated by one or more software systems, external to the enterprise social network. The external software system can be GU-OS CRM sold by salesforce.com of San Francisco, Calif. In other embodiments, the external software systems can include time entry software, document management systems, or any other external software system that similar information can be obtained. The bugs/test failures fixed field 516 can include a number field 518 and a team percentage/organization percentage field 520. The cases fixed field 522 can include a number field 524 and a team percentage/organization percentage field 526 can include a number field 524 and a team percentage/organization percentage field 520. The average days for fixed bugs/test failures field 528 can include a number field 530 and a team percentage/organization percentage field 532. The bugs currently open field 534 can include a number field 536 and a team percentage/organization percentage field 538. The average number of bugs/test failures per day field 540 can include a number field 542 and a team percentage/organization percentage field 544. The number of checkins field 546 can include a number field 548 and a team percentage/organization percentage field 550.

Figure 5B:
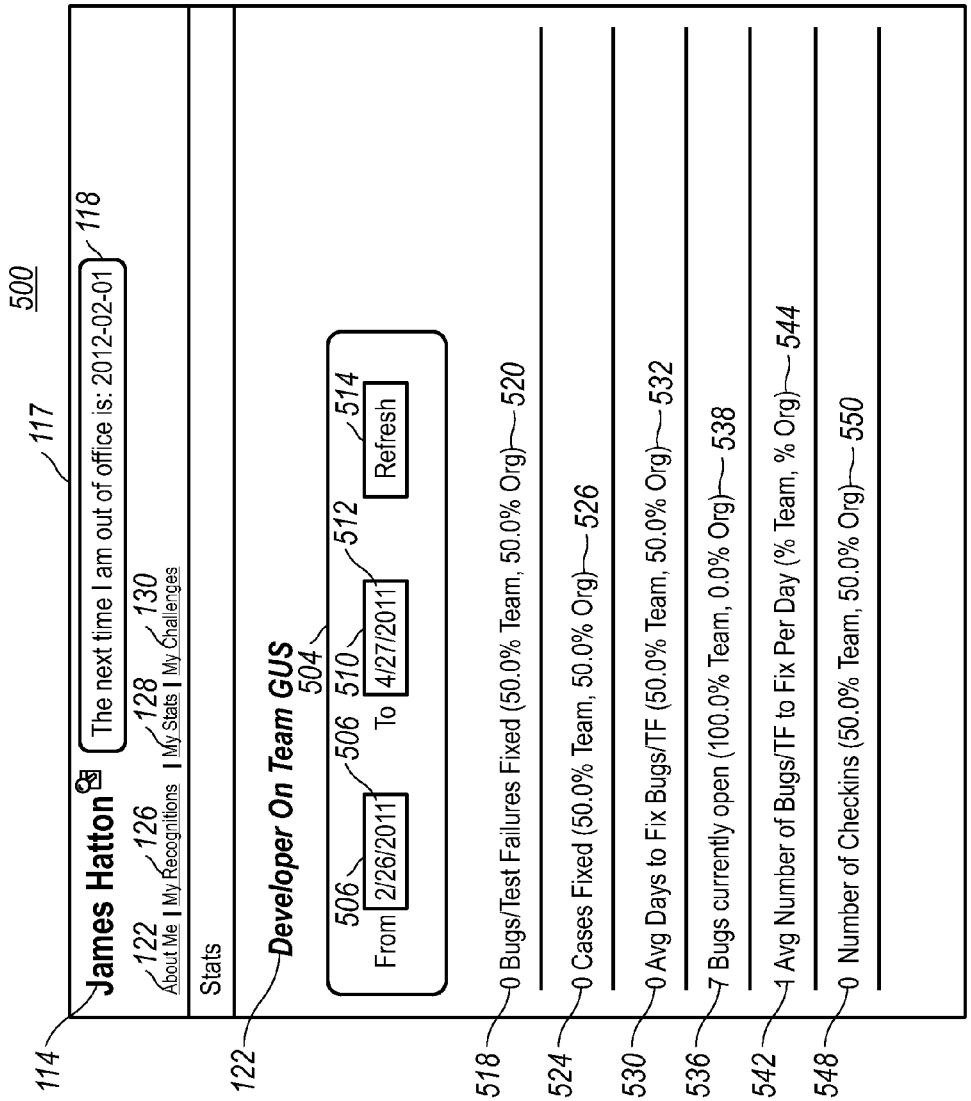
FIG. 5B is a screenshot of a my stats user interface for an enterprise social network in accordance with an exemplary embodiment.

Referring to FIG. 5B, a screenshot of a my stats user interface for an enterprise social network in accordance with exemplary embodiments is illustrated. As shown, the my stats user interface 500 can include the title, "Developer On Team GU-OS CRM" 122 for James Hatton 114. The from date is "Feb. 26, 2011" 508 and the to date is "Apr. 27, 2011" 512. James statistics are zero 518 bugs/test failures fixed 516, zero 524 cases fixed 522, zero 530 average days for fixed bugs/test failures 528, seven (7) 536 bugs currently open 534 with a one hundred percent (100%) are for the team 538, the average number of bugs/test failures per day 540 was one (1) 542 day, and zero 548 number of checkins 546.

Figure 6A:
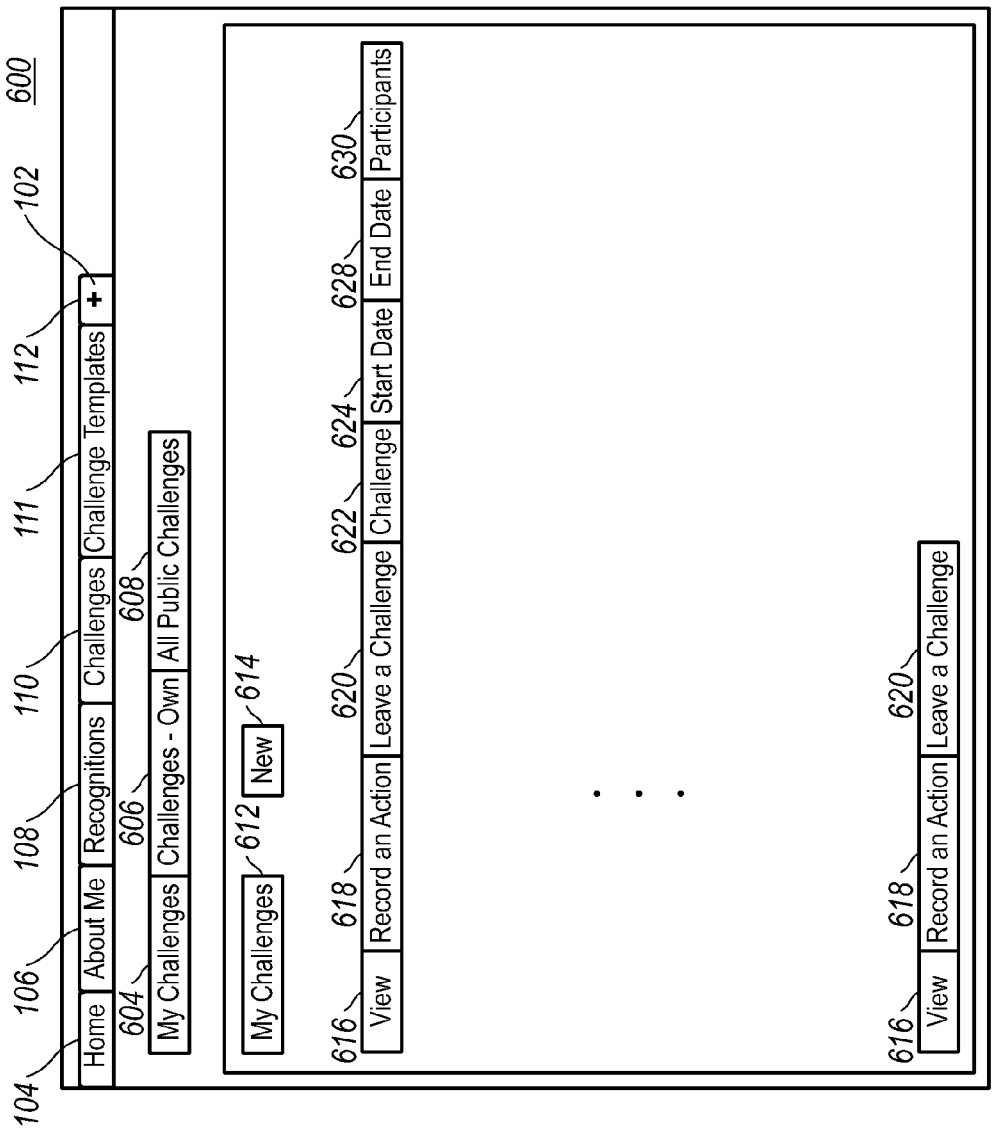
FIG. 6A is a block diagram screenshot of a my challenge user interface for an enterprise social network in accordance with an exemplary embodiment.

Referring to FIG. 6A, a block diagram screenshot of a my challenge application for the enterprise social network in accordance with exemplary embodiments is illustrated. In one or more embodiments, the my challenge user interface 600 can include the same fields, different fields or additional fields. The my challenge user interface 600 provides a user interface to allow a user to review challenge associated with the user, record an action, leave a challenge, and review particulars associated with a challenge, including, but not limited to, challenge name, owner of the challenge, start date, end date, and who the number of participants. As shown, the my challenge user interface 600 can include an application taskbar 102 which was described earlier.

The my challenge user interface 600 can include a challenge taskbar 602, including, but not limited to, links for my challenge 604, challenge—own 606, and all public challenge 608. The my challenge link 604, when selected can cause the My challenge user interface 600 to be displayed. The challenge—own link 606, when selected can cause the challenge the user initiated to be displayed. The all public challenge link 608, when selected can cause all of challenge the user can join to be displayed. The my challenge user interface 600 can include the title, such as "My Challenge" 612. The my challenge user interface 600 can include a new link 614, when selected can allow a user to enter a new challenge which is described below.

Figure 19:
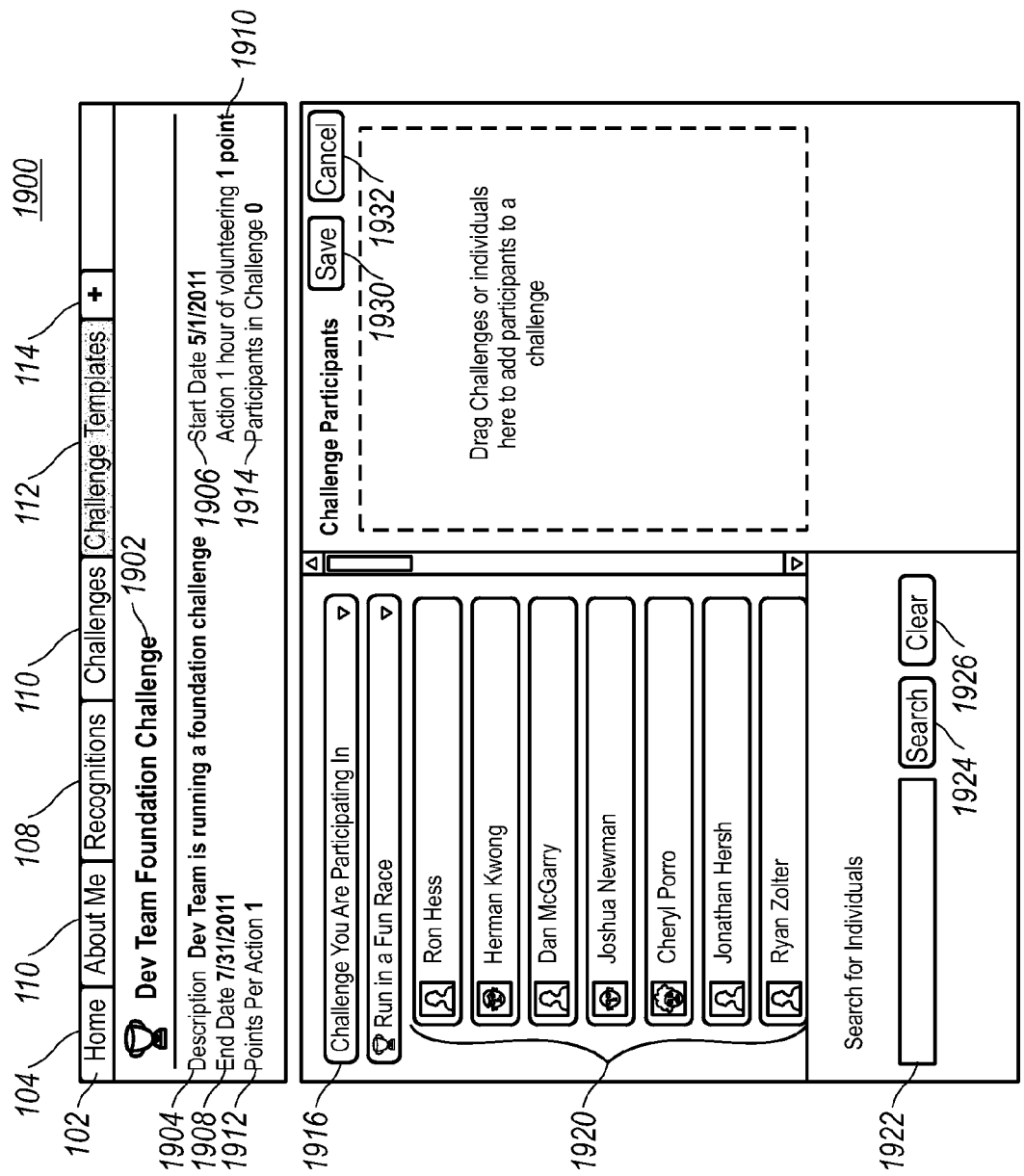
FIG. 19 is a screenshot of a specific challenge in accordance with an exemplary embodiment.

The my challenge user interface 600 can include a my challenge section 610 which can include a list of one or more challenge the user is a participant in. The list can a view link 616, record an action link 618, leave a challenge link 620, challenge 622, owner 624, start date 626, end date 628, participants 630. The view link 616, when selected can display view the details of that challenge, for example as shown in FIG. 19. The record an action link 618, when selected can allow the user to enter in an action the user performed as shown in FIG. 6B. The leave a challenge link 620, when selected can allow the user to initiate a related challenge The challenge field 622 can display the name of the associated challenge the user is a participant in. The owner field 624 can display the owner of the associated challenge, for example, who initiated the challenge. The start date field 626 can display the starting date of the associated challenge. The end date field 628 can display the ending date of the associated challenge. The participants field 630 can display the number of participants in the associated challenge.

Referring to FIG. 6B, a screenshot of a my challenge user interface for an enterprise social network in accordance with an exemplary embodiment is illustrated. As shown, the my challenge user interface 600 include ten (10) challenge that the user is a participant in. The first listed challenge is "Run in a Fun Race" 622, which was initiated by "Ron Hesser" 624. The listed challenge starts on Jan. 19, 2011 626 and ends on Mar. 19, 2011 628. The listed challenge has ten (10) participants 630. The last listed challenge is "Q1 Fish Catching Challenge" 622, which was initiated by "Cheryl Porro" 624. The listed challenge started on Apr. 1, 2011 626 and ends on May 31, 2011. The listed challenge has ten (10) participants 630.

System Overview

Referring to FIG. 7A, a block diagram of an environment wherein an on-demand database service might be used in accordance with an exemplary embodiment is illustrated. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Figure 7:
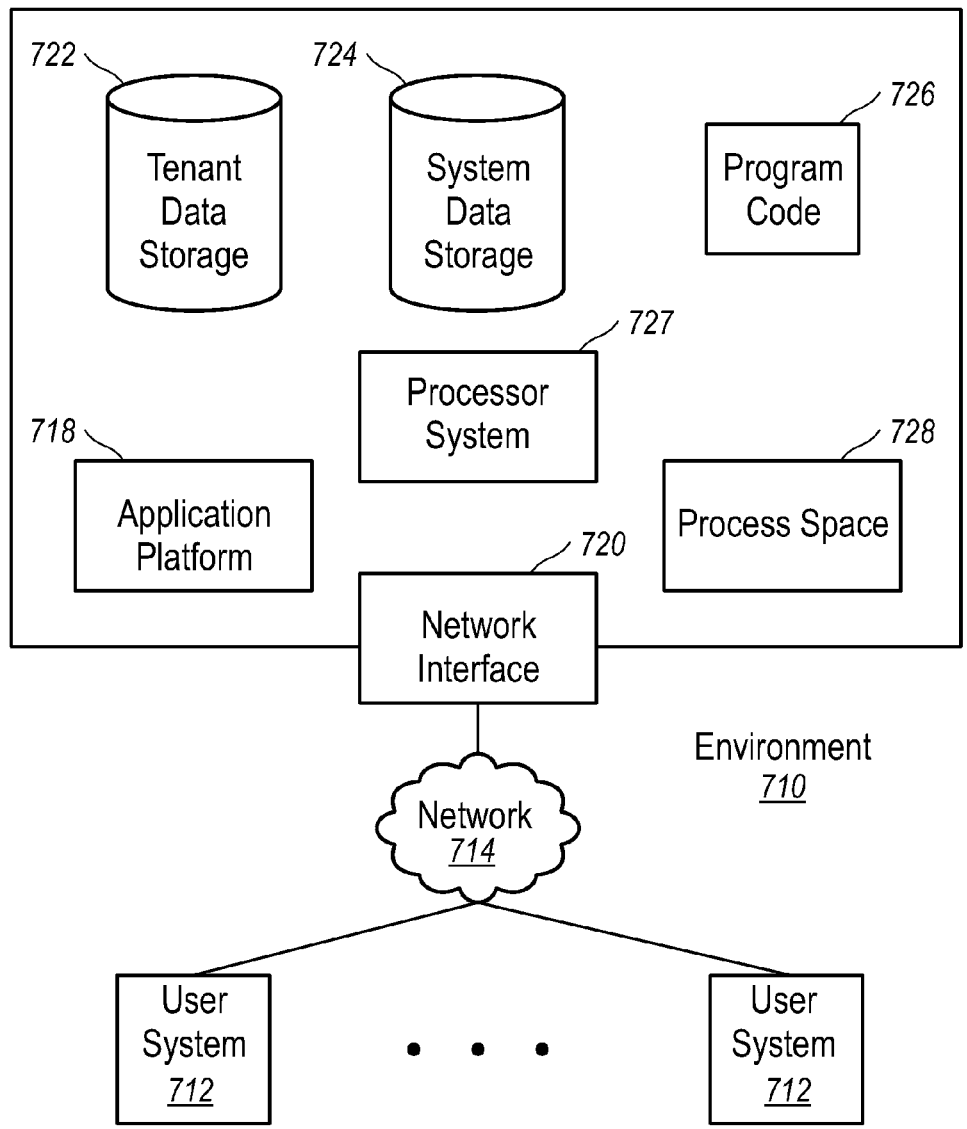
FIG. 7 is a block diagram of an example of an environment wherein an on-demand database service can be used.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 16 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
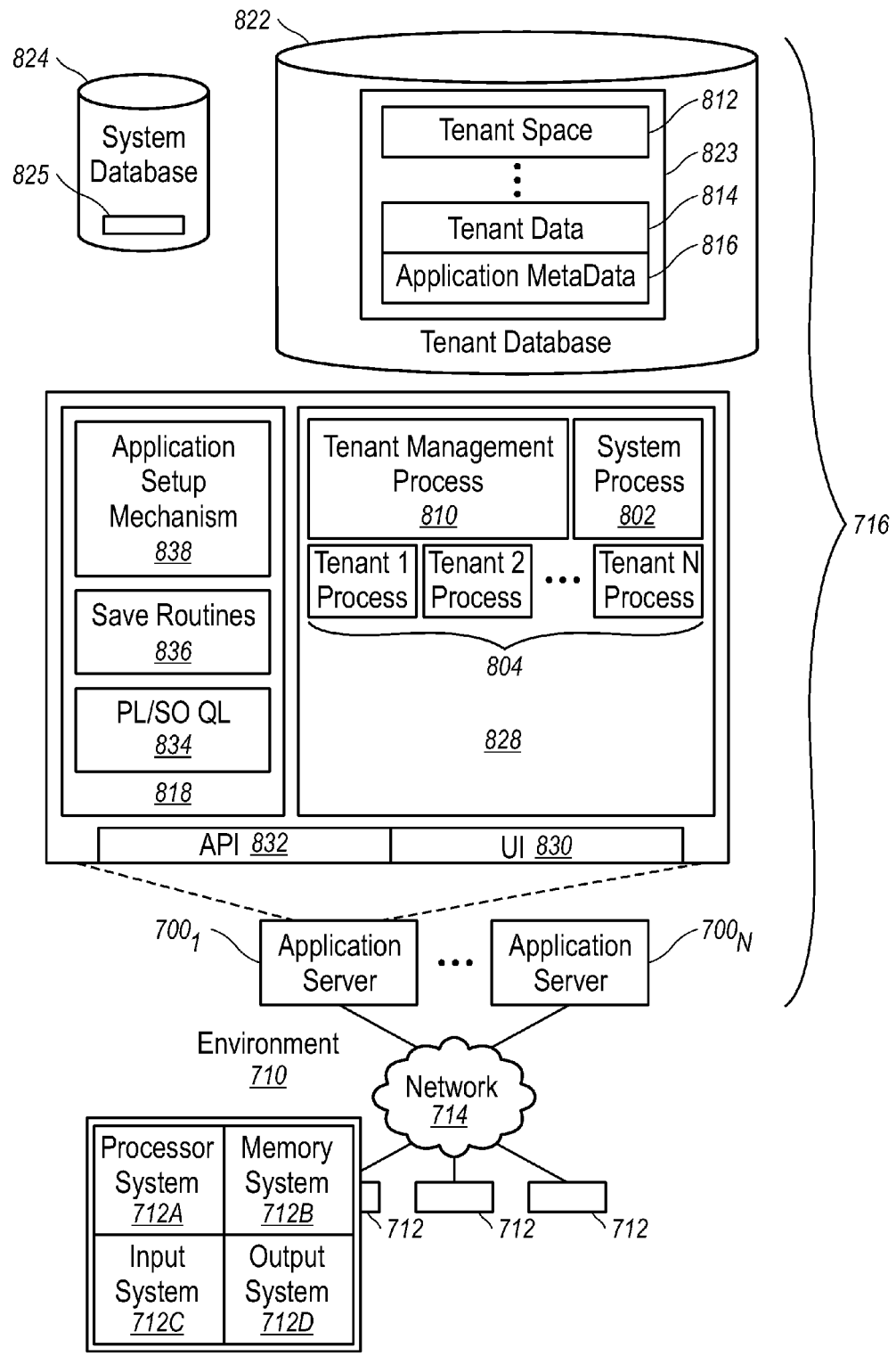
FIG. 8 is a block diagram of an embodiment of elements of FIG. 6 and various possible interconnections between these elements.

Referring to FIG. 8, a more detailed block diagram of an environment wherein an on-demand database service might be used in accordance with an exemplary embodiment is illustrated. As shown, the user system 712 may include processor system 712A, memory system 712B, input system 712C, and output system 712D. FIG. 8 shows the network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $1000_1$-$1000_N$, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 7, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 1000 may be configured to tenant data storage 722 and the tenant data 723 therein, and system data storage 724 and the system data 725 therein to serve requests of user systems 712. The tenant data 823 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manage retrieving application metadata 816 for the subscriber making the invocation and executing the metadata as an application in a virtual machine.

Each application server 700 may be communicably coupled to database systems, e.g., having access to system data 725 and tenant data 723, via a different network connection. For example, one application server $800_1$ might be coupled via the network 614 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Ongoing Feedback

Figure 9:
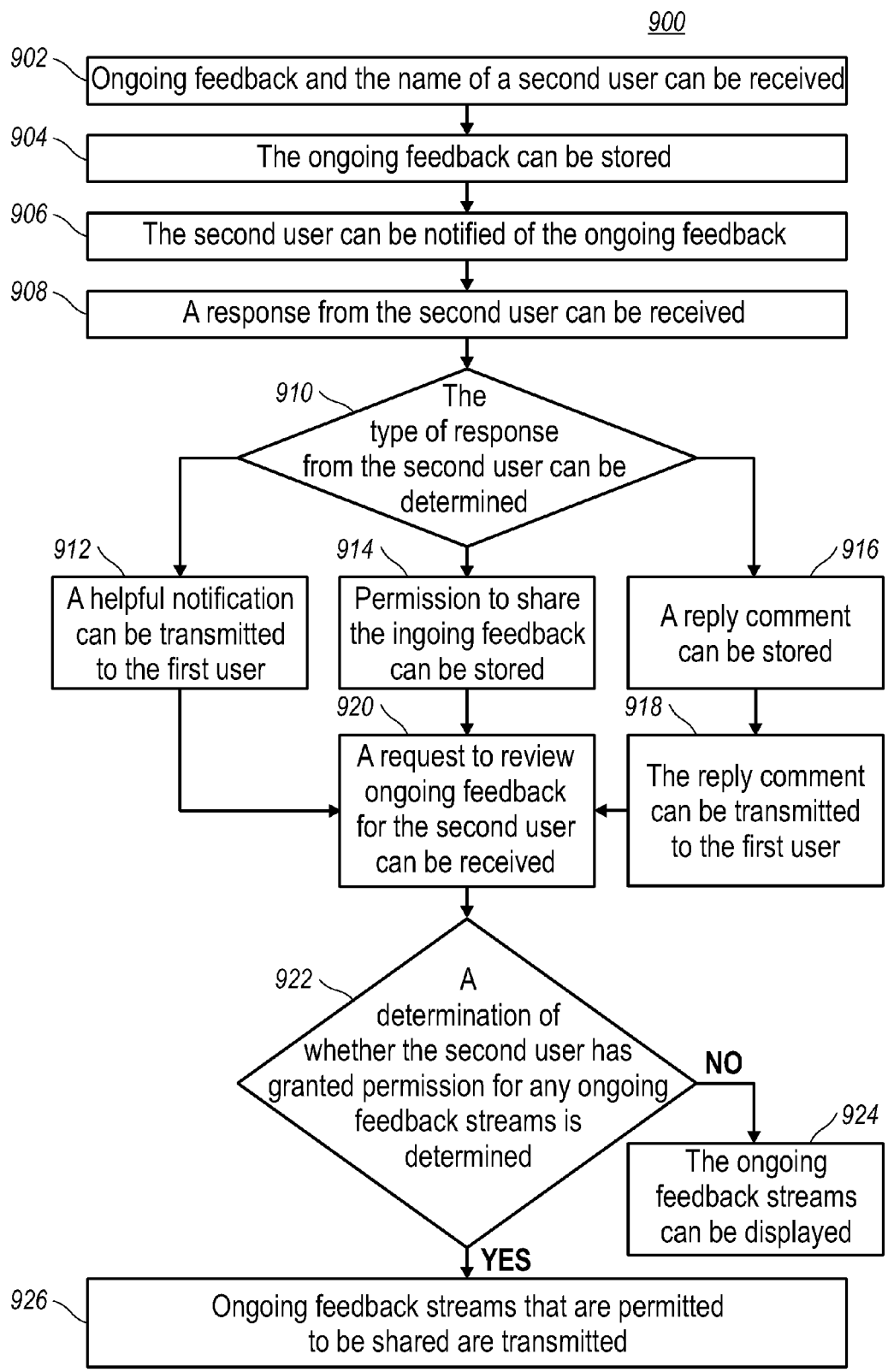
FIG. 9 is a flowchart for a method for providing ongoing feedback to a user of an enterprise social network in accordance with an exemplary implementation.

Referring to FIG. 9, a flowchart for a method for providing ongoing feedback to a user of an enterprise social network in accordance with an exemplary implementation is illustrated. The exemplary method 900 is provided by way of example, as there are a variety of ways to carry out the method. The method 900 described below can be carried out using the user systems and communication network shown in FIGS. 7 and 8 by way of example, and various elements of these figures are referenced in explaining exemplary method 900. Each block shown in FIGS. 9 represents one or more processes, methods or subroutines, carried out in exemplary method 900. The exemplary method 900 may begin at block 902.

Figure 1C:
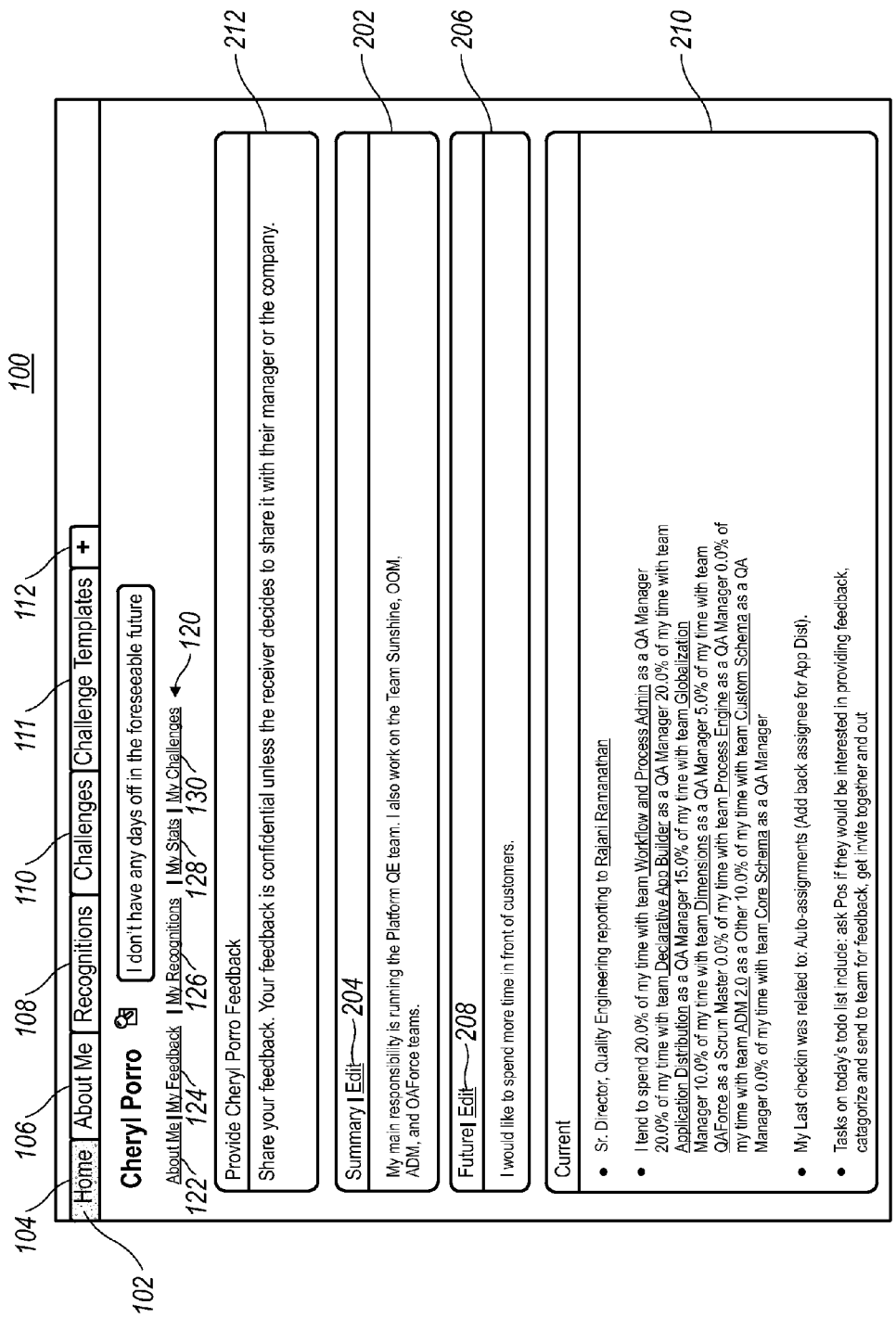
FIG. 1C is a screenshot of an ongoing feedback user interface for entering ongoing feedback in accordance with an exemplary embodiment.

At block 902, ongoing feedback and name of a second user can be received. For example, in response to a first user entering ongoing feedback for a second user, the processor system 717 can receive the ongoing feedback and name of the second user from a user system 712 associated with the first user. To enter the ongoing feedback, the first user can select the search link 117 and enter the name of the second user in a user interface, such as the ongoing feedback user interface 100 or the about me user interface 200. The defaulted user interface for the second user can be displayed on the user system 712 associated with the first user. For example, as shown in FIG. 1C, the first user can enter ongoing feedback in the ongoing feedback field 180 of the about me user interface 200 and can submit the ongoing feedback by selecting the give feedback link 182. Similarly, the ongoing feedback field 180 can pop up in the ongoing feedback user interface 100 and the first user can enter and submit the ongoing feedback. In response to the submission, the ongoing feedback can be transmitted from the user system 712 associated with the first user to the processor system 717. After receiving the ongoing feedback and name of the second user, the method 900 can proceed to block 904.

At block 904, the ongoing feedback can be stored. For example, in response to receiving the ongoing feedback and name of the second user, the processor system 717 can store the ongoing feedback in one or more databases 822. The stored ongoing feedback can be associated with the second user. After storing the ongoing feedback, the method 900 can proceed to block 906.

At block 906, the second user can be notified of the ongoing feedback. For example, the processor system 717 can transmit an email notification to the second user, can post notification of the ongoing feedback on Chatter® or another social network, and/or display the ongoing feedback on the ongoing feedback user interface 100 of the second user. The notification can include the name of the first user, the name of the second user, the ongoing feedback, a timestamp for the ongoing feedback, and a link to access the ongoing feedback user interface 100 for the second user. An example of a posting of the ongoing feedback is shown in FIG. 1B, such as "Jeanette Zalder to Cheryl Porro: Hi Cheryl—great way to keep the Sprint reviews on track with the 1 hour timeframe!" 144. After notifying the second user of the ongoing feedback, the method 900 can proceed to block 908.

At block 908, a response from the second user can be received. For example, in response to the notification, the processor system 717 can receive a response from the user system 712 associated with the second user. To enter the response, the second user can use the ongoing feedback user interface 100 shown in FIG. 1B to transmit a helpful notification to the first user, provide permission to share the ongoing feedback, or provide a reply comment to the first user. To transmit a helpful notification to the first user, the second user can select the "This Feedback is helpful!" link 146. To share the ongoing feedback, the second user can select the Share link 150. To provide a reply comment to the first user, the second user can enter a reply comment in the write a comment field 164 and select the submit comment link 166. An example of a reply comment is shown in FIG. 1B, such as Cheryl Porro Thanks!" 160. After receiving the response, the method 900 can proceed to block 910.

A block 910, the type of response from the second user can be determined. For example, the processor system 717 can determine the type of response received from the user system 712 associated with the second user. After the determination of the type of response, the method 900 can proceed to block 912 if the response was a helpful notification, can proceed to block 914 if the response was to share the ongoing feedback or can proceed to block 916 if the response is a reply comment.

At block 912, a helpful notification can be transmitted to the first user. For example, the processor system 717 can transmit an email notification to the second user, can post a helpful notification on Chatter® or another social network, and/or display the helpful notification on the ongoing feedback user interface 100 of the first user. The notification can include a message, such as "This Feedback is helpful!" After notifying the first user that the ongoing feedback was helpful, the method 900 can proceed to block 908 (not shown) where another response can be received from the second user or to block 920.

At block 914, permission to share the ongoing feedback can be stored. For example, the processor system 717 can store permission to share the ongoing feedback in one or more databases 822. The processor system 717 can set a permission parameter associated with the ongoing feedback. In one or more embodiments, once permission is granted, other users are permitted to review the ongoing feedback along with any other comments and/or replies. In one or more embodiments, the permission parameter can be to share with only the supervisor of the second user or with all users of the enterprise social network. After storing the permission, the method 900 can proceed to block 908 (not shown) where another response can be received from the second user or to block 920.

At block 916, a reply comment can be stored. For example, the processor system 717 can store the reply comment in one or more databases 822. The reply comment can be associated with the original ongoing feedback comment. After storing the reply comment, the method 900 can proceed to block 918.

At block 918, the reply comment can be transmitted to the first user. For example, the processor system 717 can transmit an email notification to the first user, can post notification of the ongoing feedback on Chatter® or another social network, and/or display the ongoing feedback on the ongoing feedback user interface 100 of the first user. The notification can include the name of the second user, the reply comment, a timestamp for the reply comment, and a link to access the ongoing feedback user interface 100 for the first user. An example of a posting of the reply comment is shown in FIG. 1B, such as "Cheryl Porro Thanks!" After providing the reply comment to the first user, the method 900 can proceed to block 908 (not shown) where another response can be received from the second user or to block 920.

At block 920, a request to review ongoing feedback for the second user can be received. For example, the processor system 717 can receive the request to review the ongoing feedback for the second user. The request can be from another user of the enterprise social network. After receiving the request, the method 900 can proceed to block 922.

At block 922, a determination of whether the second user has granted permission for any ongoing feedback streams is determined. For example, the processor system 717 can access permission parameters associated with each ongoing feedback stream associated with the second user and determines if the second user has granted permission to allow others to review each ongoing feedback stream. An ongoing feedback stream can include the original ongoing feedback, any other related comments and reply comments. In the event that there is no permission granted for any ongoing feedback streams, the method 900 can proceed to block 924 where the user is notified that there is no available ongoing feedback. For example, the processor system 717 can send a notification message to the user system 712 associated with the user informing the user that there is no available ongoing feedback associated with the second user. In the event permission has been granted to allow others to review one or more ongoing feedback streams, the method 900 can proceed to block 926.

At block 926, ongoing feedback streams that are permitted to be shared are transmitted. For example, the processor system 717 provides one or more ongoing feedback streams to the user system 712 associated with the user who requested to review the ongoing feedback associated with the second user. The ongoing feedback streams can be ordered with the most recent on top. The ongoing feedback streams can be a fixed amount or for a given time. After transmitting the ongoing feedback streams, the method 900 can proceed to block 926.

At block 926, the ongoing feedback streams can be displayed. For example, the user system 712 can display the ongoing feedback streams in the ongoing feedback user interface on the user system. The ongoing feedback streams can be displayed with the most recent ongoing feedback stream at the top of the list. The display can include one or more navigation tools to navigate through the ongoing feedback streams.

About Me

Figure 10:
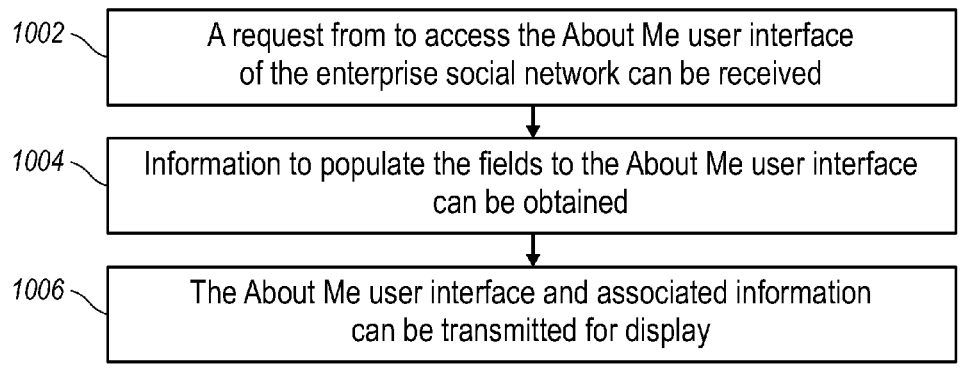
FIG. 10 is a flowchart for a method for reviewing about me information related to a user of an enterprise social network in accordance with an exemplary implementation.

Referring to FIG. 10, a flowchart for a method for reviewing about me information related to a user of an enterprise social network in accordance with an exemplary implementation is illustrated. The exemplary method 1000 is provided by way of example, as there are a variety of ways to carry out the method. The method 1000 described below can be carried out using the user systems and communication network shown in FIGS. 7 and 8 by way of example, and various elements of these figures are referenced in explaining exemplary method 1000. Each block shown in FIGS. 10 represents one or more processes, methods or subroutines, carried out in exemplary method 1000. The exemplary method 1000 may begin at block 1002.

At block 1002, a request to access the about me user interface for a user of the enterprise social network can be received. For example, the first user can select the about me link 124 from a user interface displayed on a user system 712, such as the home page as shown in FIG. 1A. The user system 712 can send the request to the processor system 717. The request can be for the about me user interface 100 associated for the first user to review his or her own about me information or from the first user to review the about me information for a second user. To review the about me information about the second user, the first user can select the search link 117 on the about me user interface 200 and enter the name of the second user as shown in FIG. 2B. The request can include the name of a designated user, such as the name of the user requesting the about me information or the name of another user of the enterprise social network. After receiving the request to access the about me user interface 100 for a user, the method 1000 can proceed to block 1004.

At block 1004, information to populate the fields of the about me user interface can be obtained. For example, in response to receiving the request the processor system 717 can access a profile associated with the designated user from one or more databases associated with the enterprise social network to obtain information associated with the first user. The information can include summary information and future information that the designated user previously entered and saved into the profile associated with the designated user. As shown in FIG. 2B, the designated user can edit this information. For example, the designated user can select the edit link 204, 208 and can edit the information. The edited information can be saved when the designated user hits an "enter" key. The information can include information obtained from one or more external software systems, such as GU-OS CRM. The information can include a list of one or more projects the first user is currently working on, a list of one or more past projects the first user worked on, a list of one or more areas of expertise of the first user, and a list of one or more software modules the first user recently checked in. The external software systems can a time entry system, a document management system that includes types of documents, a backend system, or any other external software system that can provide current projects the first user is working on, past projects the first user worked on, areas of expertise for the first user, and files or documents the first user recently saved. After populating the fields of the about me user interface 200, the method 1000 can proceed to block 1006.

At block 1006, the about me user interface and associated information can be transmitted for display. For example, the processor system 717 can transmit the about me user interface 200 and associated information to the user system 712 associated with the first user. For example, the user system 712 can receive the information and display the about me user interface 200 and associated information as shown in FIG. 2B.

Recognition

Figure 11:
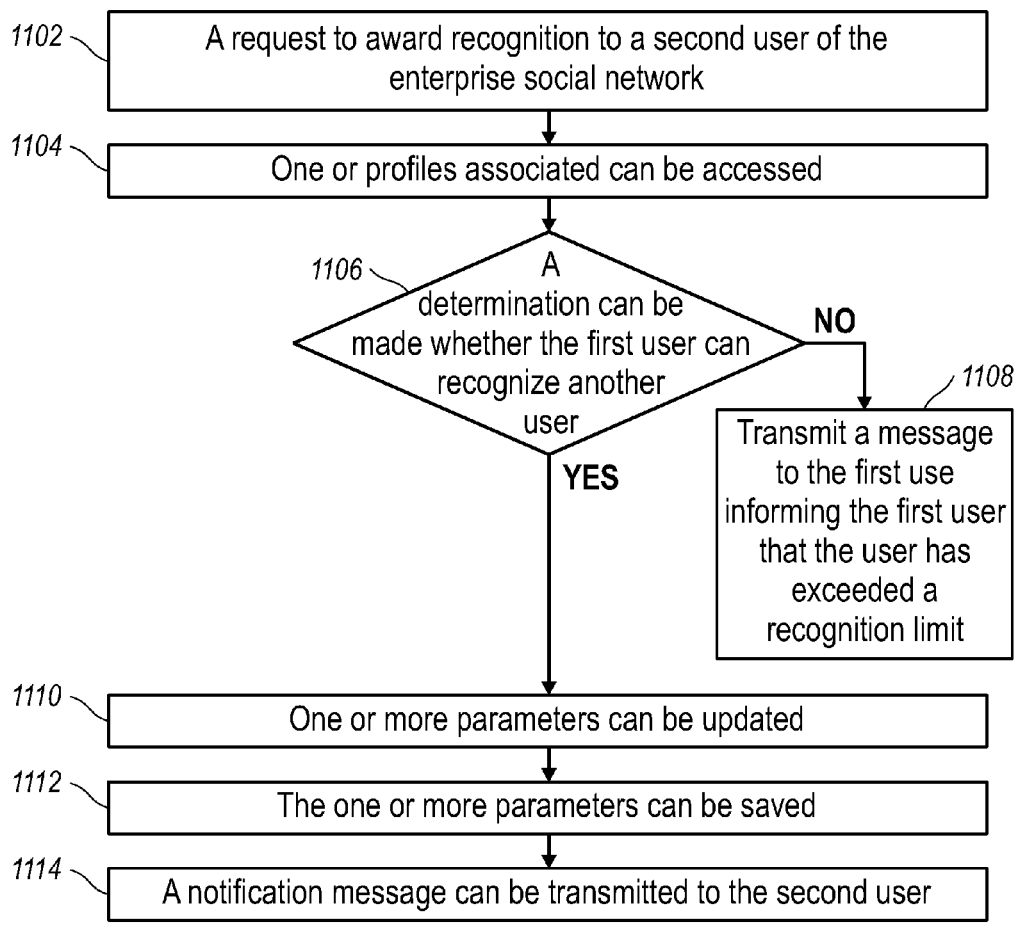
FIG. 11 is a flowchart for a method for awarding recognition to a user of an enterprise social network in accordance with an exemplary implementation.

Referring to FIG. 11, a flowchart for a method for awarding recognition to a user of an enterprise social network in accordance with an exemplary implementation is illustrated. The exemplary method 1100 is provided by way of example, as there are a variety of ways to carry out the method. The method 1100 described below can be carried out using the user systems and communication network shown in FIGS. 7 and 8 by way of example, and various elements of these figures are referenced in explaining exemplary method 1100. Each block shown in FIG. 11 represents one or more processes, methods or subroutines, carried out in exemplary method 400. The exemplary method 1100 may begin at block 1102.

At block 1102, a request to award recognition to a second user of the enterprise social network can be received. For example, a first user can access the recognition user interface 300 of the enterprise social network. To access the recognition user interface 300, the first user can select the recognition link 108 from a user interface displayed on a user system 712, such as the home page as shown in FIG. 1B. After accessing the recognition user interface 300, the first user can search for the second user by entering the name of the second user in the search for user field 340 as shown in FIG. 3B. After obtaining the name of the second user, the first user can enter the recognition comment in the write recognition comment field 342. The recognition can be submitted via a return key. In one or more embodiments, a recognize link (not shown), or any other known means to submit data via a user interface. The recognition can be for an action by the second user that is within the assigned responsibilities of the second user and/or for an action by the second user that is outside of assigned responsibilities of the second user. After the request is received, the method 1100 can proceed to block 1104.

At block 1104, one or profiles associated can be accessed. For example, the processor system 717 can access one or more databases 822 to obtain a profile associated with the first user and a profile associated with the second user. After accessing the profile associated with the fist user, the method 1100 can proceed to block 1106.

At block 1106, a determination can be made whether the first user can recognize another user. For example, the processor system 717 can review a recognition parameter stored in the user profile associated with the first user to determine if the first user has exceeded a recognition limit. If the recognition is points based, a determination can be made to determine if the first user has enough points to award the second user. If the recognition is not points based, a determination can be made to determine if the first user has recognitions to award. In the event, the first user cannot recognize another user, the method 1100 can proceed to block 1108 in which the system processor 717 can transmit a message to the user system 712 associated with the first user informing the first user that the user has exceeded the recognition limit. In the event the first user can recognize the second user, the method 1100 can proceed to block 1110.

At block 1110, one or more parameters can be updated. For example, the processor system 717 can update the recognition parameter associated with the profile of the first user. Updating can include decreasing the recognition by one (1). In the event the recognition is points based, the recognition parameter can be decreased by the amount of points that the first user awarded the second user. For example, the processor system 717 can update the total recognition parameter associated with the profile of the second user. Updating the total recognition parameter can include increasing the total recognition parameter by one (1). In the event the recognition award is points based, the first user would enter a point value for the recognition award in the recognition user interface 300 (not shown) and the total recognition parameter would be incremented by the entered point value. After updating the one or more parameters, the method 1100 can proceed to block 1112.

At block 1112, the one or more parameters can be saved. For example, the processor system 717 can save the updated recognition parameter associated with the first user and/or save the updated total recognition parameter in the profile associated with the second user. The updated profiles can be saved in the one or more databases associated with the enterprise social network. After saving the updated total recognition parameter, the method 1100 can proceed to block 1114.

At block 1114, a notification message can be provided to the second user. For example, the processor system 717 can transmit an email notification to the second user, can post notification of the recognition on Chatter® or another social network, and/or display the recognition on the recognition user interface 300 of the second user. The notification can include the name of the first user, the name of the second user, the entered comment, a timestamp for the recognition, and a link to access the recognition user interface 300 for the second user. An example of a posting of the recognition is shown in FIG. 3B, such as "Thomas Dvornik recognized Herman Kwong: Nice work on the recognitions UI!" The notification can include an image associated with the first user and/or an image associated with the second user.

Recognition Leader Board

Figure 12:
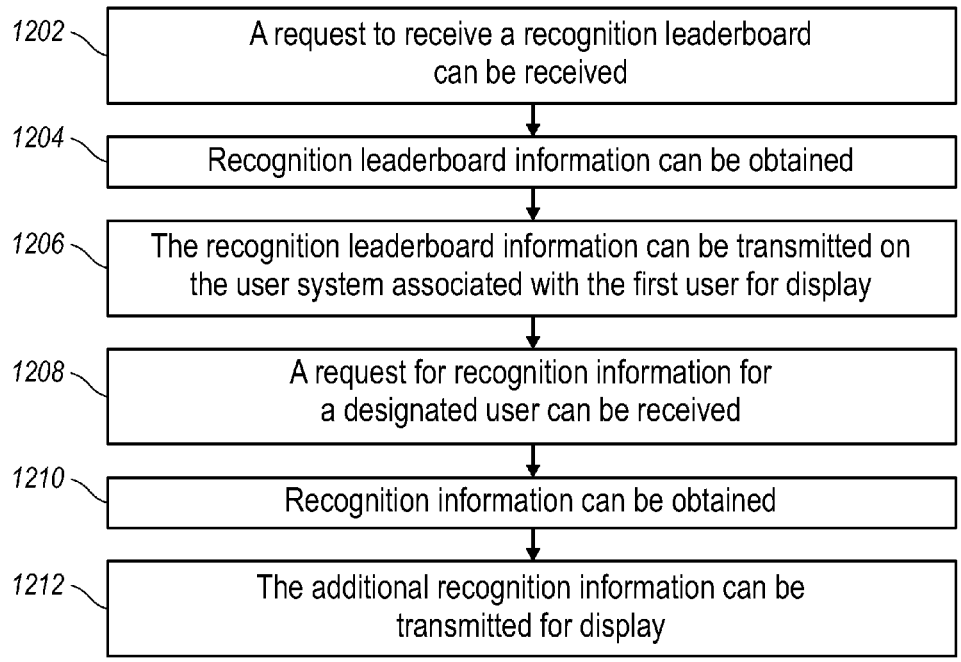
FIG. 12 is a flowchart for a method for displaying a recognition leader board for an enterprise social network in accordance with an exemplary implementation.

Referring to FIG. 12, a flowchart for a method for displaying a recognition leader board for an enterprise social network in accordance with an exemplary implementation is illustrated. The exemplary method 1200 is provided by way of example, as there are a variety of ways to carry out the method. The method 1200 described below can be carried out using the user systems and communication network shown in FIGS. 7 and 8 by way of example, and various elements of these figures are referenced in explaining exemplary method 1200. Each block shown in FIG. 12 represents one or more processes, methods or subroutines, carried out in exemplary method 400. The exemplary method 1200 may begin at block 1202.

At block 1202, a request to review a recognition leader board can be received. For example, the first user can select the recognition link 108 from a user interface displayed on a user system 712, such as the home page as shown in FIG. 1B. In response to the access, a user system 712 can transmit a request to review the recognition leader board can be transmitted and received by the processor system 717. After the request to review a recognition leader board is received, the method 1200 can proceed to block 1204.

At block 1204, recognition leader board information can be obtained. For example, the processor system 717 can access one or more databases 822 associated with the enterprise social network to obtain recognition leader board information associated with the users of the enterprise social network. The recognition leader board information can be obtained from one or more files associated with recognition user interface 300 or can be generated by querying one or more files associated with the users of the enterprise social enterprise. The recognition leader board information can be transmitted to the user system associated with the first user. The recognition leader board information can include a list of the leaders in descending order with an amount of recognition each user has been awarded and an image of each user. For example, the processor system 717 of the enterprise social network can transmit the recognition leader board information to the user system 712 associated with the first user. After transmitting the recognition leader board information, the method 1200 can proceed to block 1206.

At block 1206, the recognition leader board information can be transmitted to the user system associated with the first user for display. For example, the system processor 717 can transmit the recognition leader board information to the user system 712 associated with the first user for display in the recognition user interface 300. The recognition leader board information can be displayed in an ordered list. An exemplary recognition user interface is shown in FIG. 3B. As shown, each entry in the displayed list can include an image of a user 304, the username 306 and the number of recognitions the user has earned. The number of recognitions the user has earned can be the points each user has earned. In the event the ordered list cannot be displayed fully, a partial list can be displayed and navigation tools can be displayed to allow the user to navigate through the ordered list (not shown). The recognition user interface 300 can include information associated with the user who requested to view the recognition user interface 300. For example, an image 304 of the user, the user name 306, the number of recognitions or points the user earner 308 and the rank 312 of the user can be displayed as shown in FIG. 3B. The recognition user interface 300 can include recognition comments 330 associated with the leader as shown in FIG. 3B. Each comment 330 can include an image 326 of the user who awarded the recognition, the user name who awarded the recognition and the user name who received the recognition 328, and a timestamp 332. After displaying the recognition leader board, the method 1200 can proceed to block 1208.

At block 1108, a request for recognition information for a designated user can be received. For example, in response to the first user designating a user, the user system 712 associated with the first user can transmit the request to the system processor 717 which receives the request. The request for recognition information for a designated user can be in response to the user selecting the find me link 326 displayed on the recognition user interface 300. The request for recognition information for a designated user can be in response to a user selecting a user from the displayed list of users. The request can include the name of the designated user. After receiving the request to find the designated user, the method 1200 can proceed to block 1210.

At block 1210, recognition information can be obtained. For example, the system processor 717 can access one or more databases 822 to obtain a partial list of users in the leader board including the designated user, comments associated with the designated user, an image of the designated user, the number of recognitions the designated user has earned, and the rank the designated user has earned. After obtaining the additional recognition information, the method 1200 can proceed to block 1212.

At block 1212, the recognition information can be transmitted for display. For example, the system processor 717 can transmit the recognition information to the user system 712 of the user who requested the recognition associated with the designated user for display. The display can show the designated user in the recognition leader board. The information corresponding to the user can be emphasized. The emphasis can include listing the user first in the partial ordered list, listing the user in the middle of the partial ordered list, or the listing of the user can be highlighted, bolded, or shown in a different color. The displayed information can include comments associated. The displayed information can include an image of the designated user, the recognitions the designated user has earned and the rank of the designated user.

Challenge

Figure 13:
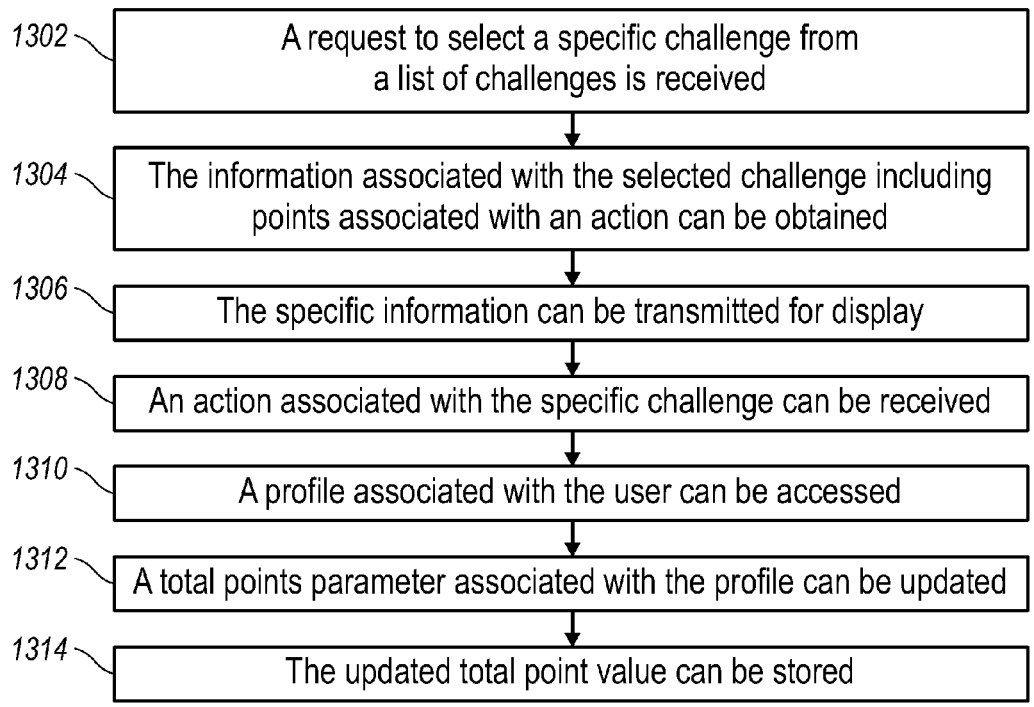
FIG. 13 is a flowchart for a method for a user to participate in a challenge of an enterprise social network in accordance with an exemplary implementation.

Referring to FIG. 13, a flowchart for a method for a user to participate in a challenge of an enterprise social network in accordance with an exemplary implementation is illustrated. The exemplary method 1300 is provided by way of example, as there are a variety of ways to carry out the method. The method 1300 described below can be carried out using the user systems and communication network shown in FIGS. 7 and 8 by way of example, and various elements of these figures are referenced in explaining exemplary method 1300. Each block shown in FIGS. 13 represents one or more processes, methods or subroutines, carried out in exemplary method 400. The exemplary method 1300 may begin at block 1302.

At block 1302, a request to select a specific challenge from a list of challenges is received. For example, the processor system 717 can receive a request, from a user system 712, selecting a specific challenge from a list of challenge a user is a participant in. The list of challenges can be displayed in a challenge user interface 400 as shown in FIG. 6B. After receiving the request, the method 1300 can proceed to block 1304.

At block 1304, the information associated with the selected challenge including points associated with an action can be obtained. For example, the processor system 717 can access one or more databases 822 to obtain information associated with the selected challenge. The information associated with the selected challenge can include a name of the challenge parameter, a description parameter, an action parameter, a points per action parameter, a start date parameter, an end data parameter, a number of participants parameter, and a points category parameter. The different categories can include, but is not limited to, sales points, philanthropy points, wellness points; organization points, and developer points. In one or more embodiments, the information associated with a challenge can include a private parameter. The private parameter can indicate if a challenge is a private challenge or a public challenge. For private challenges, the owner of the challenge can invite users to participate or can designate users as being part of the challenge, with all other users excluded. For public challenges, the challenge is open, so a user can elect to participate in the challenge. The owner of the challenge can enter the information associated with challenge parameters when the challenge is setup. This is explained in further detail below. After obtaining the information, the method 1300 can proceed to block 1306.

At block 1306, the specific information can be transmitted for display. For example, the processor system 717 can transmit the specific information to the user system 712 for display. The user system 712 can display the specific information in the challenge user interface 400 in response to receiving the specific information. For example, a screenshot of a specific challenge is shown in FIG. 6B. As shown, the description is "a 5K Charity Race 412, the start date is "Jan. 19, 2011" 414, the end date is "Mar. 19, 2011" 416, the action is "Run a race, get 10 points" 418, the points per action is "10" 420, and participants in challenge is "10" 430. After displaying the specific information, the method 1300 can proceed to block 1308.

At block 1308, an action associated with the specific challenge can be received. For example, the user can select the record an action link 408 to enter the action. In response to record an action link 408 being selected, the user system 712 can transmit the action to the processor system 717. After receiving the action, the method 1300 can proceed to block 1310.

At block 1310, a profile associated with the user can be accessed. For example, the processor system 717 can access one or more databases 822 to obtain a profile associated with the user. After accessing the profile associated with the user, the method 1300 can proceed to block 1312.

At block 1312, a total points parameter associated with the profile can be updated. For example, the processor system 717 can update the total points parameter by adding points associated with the action to a total point value associated with the total points parameter in response to receiving the action. After updating the total points parameter, the method 1300 can proceed to block 1314.

At block 1314, the updated total point value can be stored. For example, the processor system can store the updated total point value in the one or more databases 822.

Challenges Leader Board

Figure 14:
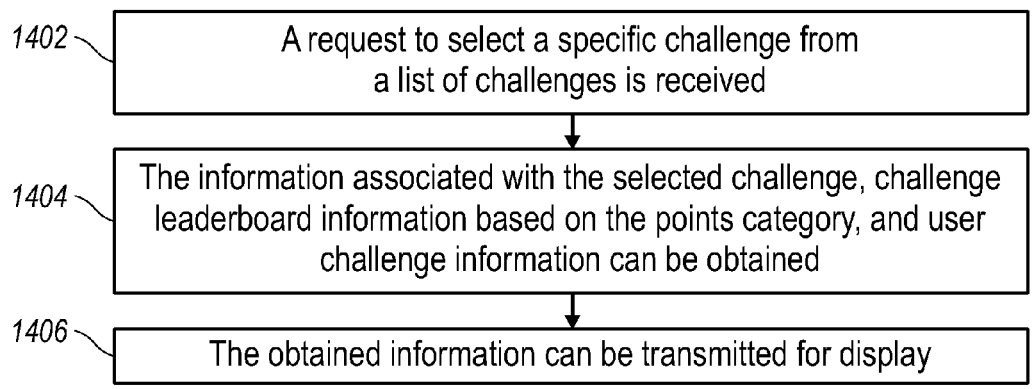
FIG. 14 is a flowchart for a method for displaying a challenge leader board for an enterprise social network in accordance with an exemplary implementation.

Referring to FIG. 14, a flowchart for a method for displaying a challenge leader board for an enterprise social network in accordance with an exemplary implementation is illustrated. The exemplary method 1400 is provided by way of example, as there are a variety of ways to carry out the method. The method 1400 described below can be carried out using the user systems and communication network shown in FIGS. 7 and 8 by way of example, and various elements of these figures are referenced in explaining exemplary method 1400. Each block shown in FIGS. 14 represents one or more processes, methods or subroutines, carried out in exemplary method 1400. The exemplary method 1400 may begin at block 1402.

At block 1402, a request to select a specific challenge from a list of challenges can be received. For example, the processor system 717 can receive a request, from a user system 712, selecting a specific challenge from a list of challenge a user is a participant in. The list of challenges can be displayed in a challenge user interface 400 as shown in FIG. 6B. After receiving the request, the method 1400 can proceed to block 1404.

At block 1404, the information associated with the selected challenge, challenge leader board information based on the points category, and user challenge information can be obtained. For example, the processor system 717 can access one or more databases 822 to obtain information associated with the selected challenge. The information associated with the selected challenge can include a name of the challenge parameter, a description parameter, an action parameter, a points per action parameter, a start date parameter, an end data parameter, a number of participants parameter, and a points category parameter. The different categories can include, but is not limited to, sales points, philanthropy points, wellness points; organization points, and developer points. The challenge leader board information can be obtained from one or more files associated with recognition user interface 300 based on the points category or can be generated by querying one or more files associated with the users of the enterprise social enterprise with the query including the points category parameter. The user challenge information can include number of points the first user has earned, the number of actions the first user has performed, and the leader board position of the first user. The user challenge information is based on the points category associated with the selected challenge. After obtaining the information, the method 1400 can proceed to block 1406.

At block 1406, the obtained information can be transmitted for display. For example, the processor system 717 can transmit the obtained information to the user system 712 for display. The user system 712 can display the specific information and the challenge leader board information in the challenge user interface 400 in response to receiving the specific information. For example, a screenshot of a specific challenge is shown in FIG. 6B. As shown, the description is "a 5K Charity Race" 412, the start date is "Jan. 19, 2011" 414, the end date is "Mar. 19, 2011" 416, the action is "Run a race, get 10 points" 418, the points per action is "10" 420, and participants in challenge is "10" 430. As shown, the challenge leader board information can be displayed with the leader board being based on the points category. As shown, the leader is Lanini Arunchalam 476 with forty (40) points 460. The challenge information associated with the first user for the points category associated with the selected challenge is also shown. The first user has earned thirty (30) points 460, performed three (3) actions 464, and is ranked second 468.

Referring to FIG. 15, a flowchart for a method for reviewing my stats information related to a user of an enterprise social network in accordance with an exemplary implementation is illustrated. The exemplary method 1500 is provided by way of example, as there are a variety of ways to carry out the method. The method 1500 described below can be carried out using the user systems and communication network shown in FIGS. 7 and 8 by way of example, and various elements of these figures are referenced in explaining exemplary method 1500. Each block shown in FIGS. 15 represents one or more processes, methods or subroutines, carried out in exemplary method 15000. The exemplary method 1500 may begin at block 1502.

At block 1502, a request to access the my stats user interface for a user of the enterprise social network can be received. For example, the user can select the my stats link 128 from a user interface displayed on a user system 712, such as the home page as shown in FIG. 1A. The user system 712 can send the request to the processor system 717. The request can be for the my stats user interface 500 associated with the user to review his or her own statistical information. The request can include the name of the user of the enterprise social network. After receiving the request to access the my stats user interface 500, the method 1500 can proceed to block 1504.

At block 1504, information to populate the fields of the my stats user interface can be obtained. For example, in response to receiving the request the processor system 717 can access obtain information from one or more external software systems, such as GU-OS CRM. The information can include statistics associated with the user's performance, such as, but not limited to, bugs/test failures fixed, cases fixed, average days for fixed bugs/test failures, bugs currently opened, average number of bugs/test failures to fix per day, and number of checkins Each of the statistics can include the percentage for the team and percentage for the organization. In one or more embodiments, the statistics can be obtained from one or more, internal and/or external software systems. For example, the software systems can be a time entry system, a document management system that includes types of documents, a backend system, or any other external software system that can provide statistics of projects the user is working on, scheduled to work on, and/or has worked on. After populating the fields of the my stats user interface 500, the method 1500 can proceed to block 1506.

At block 1506, the about me user interface and associated information can be transmitted. For example, the processor system 717 can transmit the about me user interface 200 and associated information to the user system 712 associated with the first user. For example, the user system 712 can receive the information and display the about me user interface 200 and associated information as shown in FIG. 5B.

Figure 16:
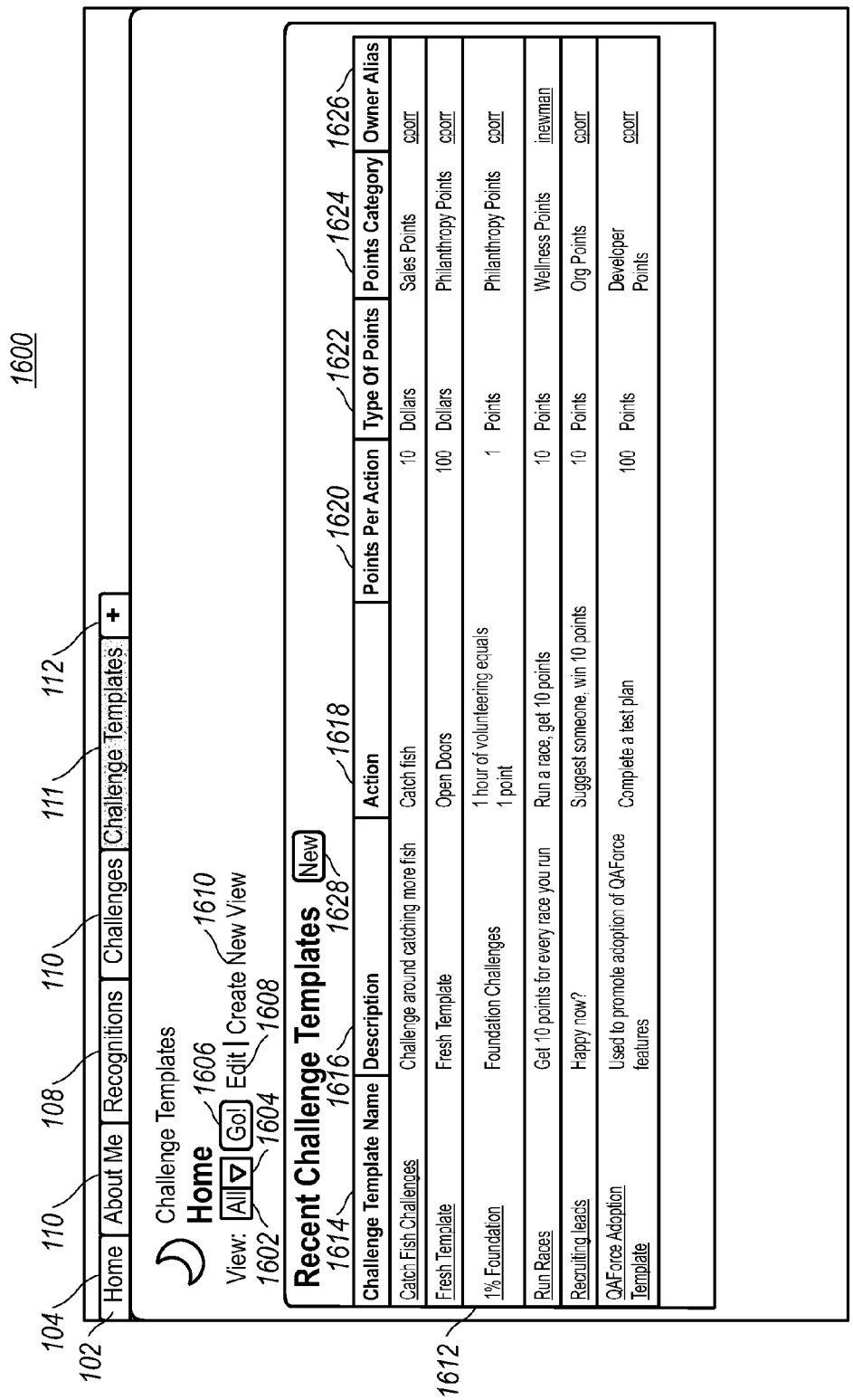
FIG. 16 is a screenshot of a challenge templates user interface in accordance with an exemplary embodiment.

Referring to FIG. 16, a screenshot of a challenge templates user interface in accordance with an exemplary embodiment is illustrated. To access the challenge templates user interface 1600, a user can click on the challenge templates link 112 from a user interface, such as the home user interface 100. As shown, the challenge templates user interface 1600 can include an application taskbar 102, a user name field 114, an image field 116, a search link 117, an activity bar 118, and a personal links bar 120 which were described earlier. The challenge templates user interface 1600 can include a view field 1602, a "go!" button 1606, an edit link 1608, and a create new view link 1610. The view field 1602 can include a drop down menu 1604 to select the view. The drop down menu 1604 can include menu items to view challenge templates, such as all, recent, and mine. The go! button 1606 when selected causes the challenge templates based on the view to be displayed. As shown, the recent challenge templates are displayed. The edit link 1608 allows a user with administrative authority to edit the drop down menu items of the view. The create new view 610 allows a user with administrative authority to create new views for templates. Only users with administrative authority can create challenge templates. In one or more embodiments, all users can have administrative authority to create challenge templates. Only users with administrative authority can create challenges. In one or more embodiments, all users can have administrative authority to create challenges.

The challenge templates user interface 1600 can include a display area 1612 to display previously created templates based on the menu item in the view field 1602 and can create new challenge templates. The display area 1612 can include a table with headers. The headers can include, but are not limited to, challenge template name 1614, description 1616, action 1618, points per action 1620, type of points 1622, points category 1624, and owner alias 1626. The challenge template name header 1614 can lists the name of each challenge template. The description name header 1616 can list a description of each challenge template. The action header 1618 can list the different actions users can perform to earn points or dollars. The points per action header 1620 can list the number of points or dollars a user can earn. The type of points header 1622 can list the type of points, which can be points or dollars. In one or more embodiments, there can be additional types of points such as compensation time. The points category header 1624 can lists the points category for each template. The points category can include, but is not limited to, sales points, philanthropy points, wellness points, organizational points, and developer points. The owner alias header 1626 can list the originator of each challenge template. The first challenge template if for a catch fish challenge 1614 which is a challenge around catching more fish (customers or clients) 1616. For each fish that is caught 1618, the user can earn ten dollars ($10) 1620, 1622 which is in the sales points category 1624. The alias of the owner or creator of the challenge template is cporr 1626. The display area 1612 can also include a new link 1628 to allow a user to create a new challenge template.

Figure 17:
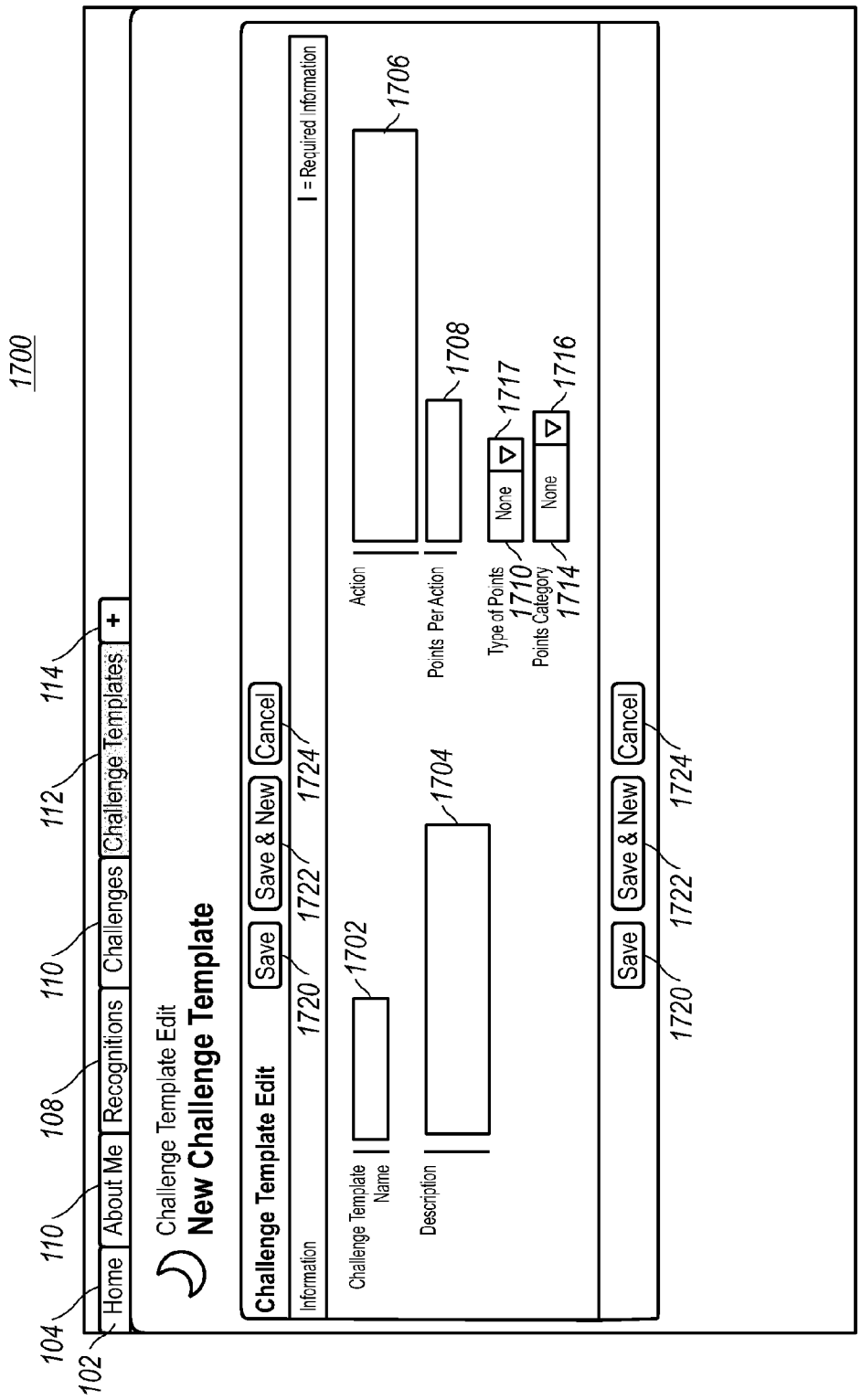
FIG. 17 is a screenshot of a new challenge templates user interface in accordance with an exemplary embodiment.

Referring to FIG. 17, a screenshot of a new challenge templates user interface in accordance with an exemplary embodiment is illustrated. The new challenge template user interface 1700 can be used to generate a new challenge template. For example, a user can select the new link 1628 from the challenge templates user interface 1700 to access the new challenge Template user interface 1700. As shown, the new challenge templates user interface 1700 can include an application taskbar 102, a user name field 114, an image field 116, a search link 117, an activity bar 118, and a personal links bar 120 which were described earlier. As shown, the specific challenge user interface 700 can have a challenge template name field 1702, a description field 1704, an action field 1706, a points per action field 1708, a type of points field 1710, and a points category field 1714. The challenge template name field 1702 can include the name of the challenge template. The description field 1704 can include a description of the challenge template. The action field 1706 can include one or more actions users can perform to earn points. The points per action field 1708 can include an amount of points a user can earn for completing an action. The type of points field 1710 can include a drop down menu 1710 for selecting the type of points, such as points or money. The points category field 1714 can include a drop down menu 1716 for selecting a points category, which can include, but is not limited to, sales points, philanthropy points, wellness points, organization points, and developer points. The Challenge Templates user interface 1700 can include a save button 1720, save and new button 1722, and a cancel button 1724. The save button 1720, when selected can save a new challenge template. After the new challenge template is saved, the home user interface, such as the Feedback user interface 100, can be displayed. The save and new button 1722, when selected can save a new challenge template and return the user to the new challenge template user interface 1700 to create another new challenge template. The cancel button 1725, when selected can cancel the creation of a new challenge template and can return the user to the new challenge template user interface 1700.

Figure 18:
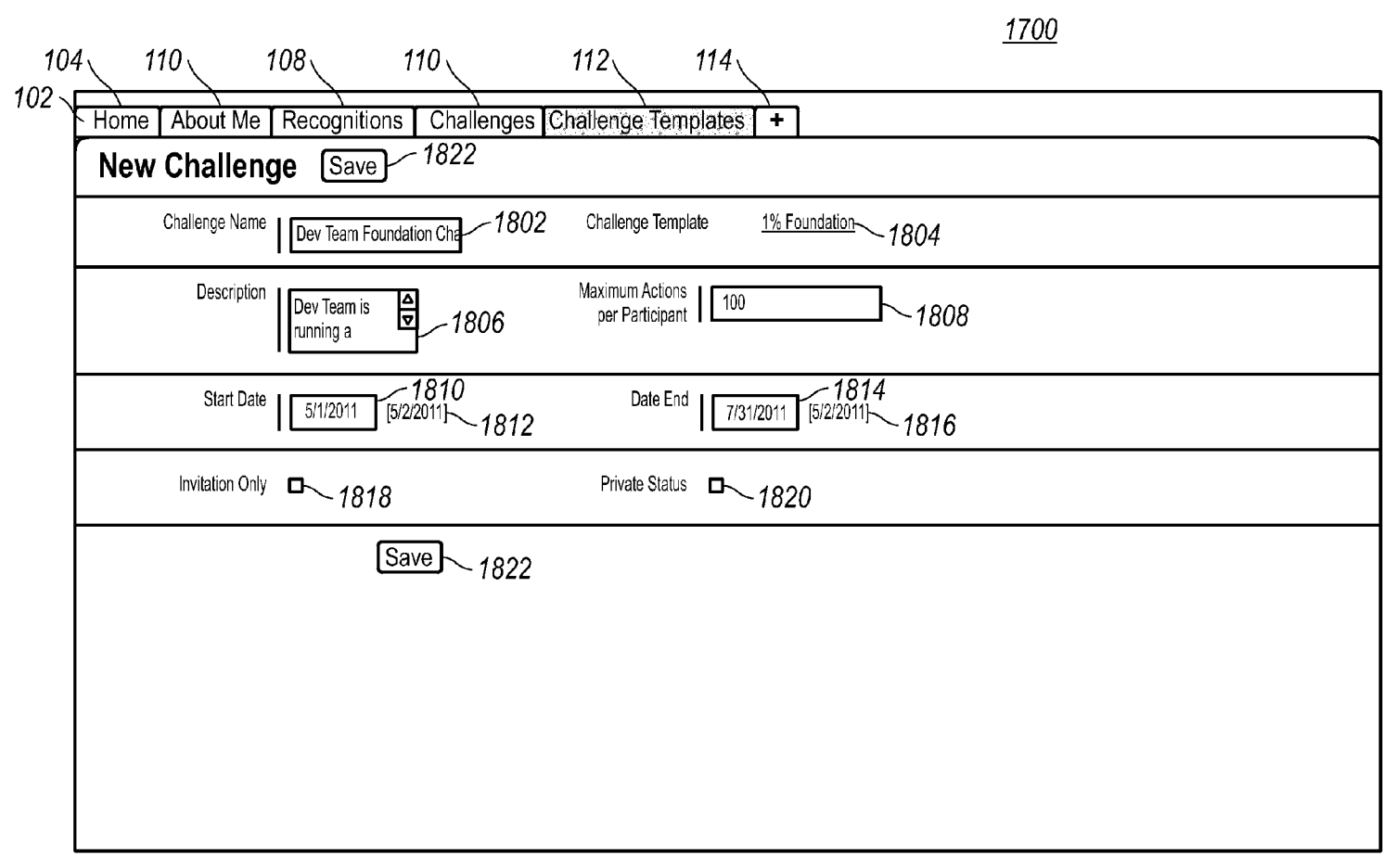

Referring to FIG. 18, a screenshot of a new challenge user interface having entered data in accordance with an exemplary embodiment is illustrated. The new challenge user interface 1800 can be used to generate a new challenge. For example, a user can select the new link 1628 from the challenge templates user interface 1700 to access the new challenge user interface 1700. As shown, the new challenge user interface 1800 can include an application taskbar 102, a user name field 114, an image field 116, a search link 117, an activity bar 118, and a personal links bar 120 which were described earlier. As shown, the challenge name is "Dev Team Foundation Challenge" 1802. The challenge is based on the 1% Foundation template 1804. The description of the challenge is "Dev team is running a foundation challenge" 1806. The challenge can have a maximum of one hundred (100) participants 1808. The challenge starts on May 1, 2011 1810 and ends on Jul. 31, 2011 1814. The challenge is not an invitation only 1818 challenge. In the event the invitation only option 1818 was selected, then each participant would have to be invited. The challenge is also not a private challenge. In the event the private status option 1820 was selected, then only the participants that were invited would be able to view the challenge.

Referring to FIG. 19, a screenshot of a specific challenge in accordance with an exemplary embodiment is illustrated. As shown, the screenshot 1900 include the name of a challenge which is "Dev Team Foundation Challenge" 1902. The description of the challenge is "Dev team is running a foundation challenge" 1904. The challenge starts on May 1, 2011 1906 and ends on Jul. 31, 2011 1908. To earn one (1) point 1912, the user need do complete one (1) hour of volunteering 1910. The screenshot 1900 includes a drop down menu 1916 to allow a user to view the challenges the user is in. The participants 1920 in the "Run in a Fun Race Challenge" include Ron Hess, Herman Kwong, Dan McGarry, Joshua Newman, Cheryl Porro, Jonathan Hersch, and Ryan Zotter. The user can select one or more users from the Run in a Fun Race Challenge to add to the Dev Team Foundation Challenge. To do so, the user can select one or more users and drag the users name over to the participants box 1928. To select more than one user, the user can use press the control key and select each user to add using a navigation tool or can use the shift key and select a top name and a bottom name to select a group of consecutively listed users. Other selection means can be used to add a group of participants to a challenge. The user can also search for users by entering a user name in the name field 1922 and select the search button 1924. To clear the name field 1922, the user can select the cancel button 1926. To save the challenge, the user can select the save button 1930. The cancel the challenge, the user can select the cancel button 1932.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for providing a challenge user interface for an enterprise social network including users associated with an entity, the method comprising:
   receiving, by a processor system of the enterprise social network, a request to select a specific challenge from a list of challenges a user is a participant, the list being displayed on a user system associated with the user;
   obtaining, from one or more databases associated with the enterprise social network, information associated with the selected challenge including points associated with an action;
   transmitting, by the processor system, the information to the user system for display;
   receiving, by the processor system, an action associated with the specific challenge;
   obtaining, from the one or more databases, a user profile associated with the user;
   updating, by the processor system, a total points parameter associated with the profile by adding points associated with the action to a total point value associated with the total points parameter in response to receiving the action;
   storing, in the one or more databases, the updated total point value.

2. The method of claim 1 wherein the information included with the specific challenge comprises a name of the challenge parameter, a description parameter, an action parameter, a points per action parameter, a start date parameter, an end data parameter, a number of participants parameter.

3. The method of claim 2 wherein an owner of the challenge determined the points associated with the action.

4. The method of claim 2 wherein the information included with the specific challenge includes a points category parameter comprising sales points, philanthropy points, wellness points; organization points, and developer points.

5. The method of claim 2 wherein the information included with the specific challenge further comprises a private parameter which indicates whether the challenge is private challenge or public challenge.

6. The method of claim 5 wherein for a private challenge, an owner of the challenge designated users of the enterprise social network to participate in the challenge.

7. The method of claim 5 wherein for a public challenge, each participant selected to participate in the challenge.

8. A non-transitory machine-readable medium carrying one or more sequences of instructions for providing a challenge user interface for an enterprise social network including users associated with an entity, which instructions, when executed by one or more processors, cause the one or more processors to carry out the steps of:
receiving, by a processor system of the enterprise social network, a request to select a specific challenge from a list of challenges a user is a participant, the list being displayed on a user system associated with the user;
obtaining, from one or more databases associated with the enterprise social network, information associated with the selected challenge including points associated with an action;
transmitting, by the processor system, the information to the user system for display;
receiving, by the processor system, an action associated with the specific challenge;
obtaining, from the one or more databases, a user profile associated with the user;
updating, by the processor system, a total points parameter associated with the profile by adding points associated with the action to a total point value associated with the total points parameter in response to receiving the action;
storing, in the one or more databases, the updated total point value.

9. The non-transitory machine-readable medium of claim 8 wherein the information included with the specific challenge comprises a name of the challenge parameter, a description parameter, an action parameter, a points per action parameter, a start date parameter, an end data parameter, a number of participants parameter.

10. The non-transitory machine-readable medium of claim 9 wherein an owner of the challenge determined the points associated with the action.

11. The non-transitory machine-readable medium of claim 9 wherein the information included with the specific challenge includes a points category parameter comprising sales points, philanthropy points, wellness points; organization points, and developer points.

12. The non-transitory machine-readable medium of claim 9 wherein the information included with the specific challenge further comprises a private parameter which indicates whether the challenge is private challenge or public challenge.

13. The non-transitory machine-readable medium of claim 12 wherein for a private challenge, an owner of the challenge designated users of the enterprise social network to participate in the challenge.

14. The non-transitory machine-readable medium of claim 12 wherein for a public challenge, each participant selected to participate in the challenge.

15. An apparatus for providing a challenge user interface for an enterprise social network including users associated with an entity, the apparatus comprising:
a processor system; and
one or more stored sequences of instructions which, when executed by the processor, cause the processor system to carry out the steps of:
receiving a request to select a specific challenge from a list of challenges a user is a participant, the list being displayed on a user system associated with the user;
obtaining, from one or more databases associated with the enterprise social network, information associated with the selected challenge including points associated with an action;
transmitting the information to the user system for display;
receiving an action associated with the specific challenge;
obtaining, from the one or more databases, a user profile associated with the user;
updating a total points parameter associated with the profile by adding points associated with the action to a total point value associated with the total points parameter in response to receiving the action;
storing, in the one or more databases, the updated total point value.

16. The apparatus of claim 15 wherein the information included with the specific challenge comprises a name of the challenge parameter, a description parameter, an action parameter, a points per action parameter, a start date parameter, an end data parameter, a number of participants parameter.

17. The apparatus of claim 15 wherein an owner of the challenge determined the points associated with the action.

18. The apparatus of claim 15 wherein the information included with the specific challenge includes a points category parameter comprising sales points, philanthropy points, wellness points; organization points, and developer points.

19. The apparatus of claim 15 wherein the information included with the specific challenge further comprises a private parameter which indicates whether the challenge is private challenge or public challenge.

20. The apparatus of claim 15 wherein for a private challenge, an owner of the challenge designated users of the enterprise social network to participate in the challenge.

* * * * *